(12) United States Patent
Hirose et al.

(10) Patent No.: US 11,181,293 B2
(45) Date of Patent: Nov. 23, 2021

(54) AIR-CONDITIONING APPARATUS

(71) Applicant: Mitsubishi Electric Corporation, Tokyo (JP)

(72) Inventors: Chiyoko Hirose, Tokyo (JP); Daisuke Sugiyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 56 days.

(21) Appl. No.: 16/476,962

(22) PCT Filed: Apr. 7, 2017

(86) PCT No.: PCT/JP2017/014546
§ 371 (c)(1),
(2) Date: Jul. 10, 2019

(87) PCT Pub. No.: WO2018/185937
PCT Pub. Date: Oct. 11, 2018

(65) Prior Publication Data
US 2020/0018507 A1    Jan. 16, 2020

(51) Int. Cl.
*F24F 11/86*  (2018.01)
*F24F 11/79*  (2018.01)
(Continued)

(52) U.S. Cl.
CPC .............. *F24F 11/79* (2018.01); *F24F 11/86* (2018.01); *F25B 13/00* (2013.01); *F25B 49/02* (2013.01);
(Continued)

(58) Field of Classification Search
CPC .. F24F 11/49; F24F 11/74; F24F 11/79; F24F 11/86; F24F 2110/10; F24F 2110/12;
(Continued)

(56) References Cited

U.S. PATENT DOCUMENTS 8,826,678 B2 * 9/2014 Nakagawa ................. 62/177
2006/0254293 A1 * 11/2006 Lee .......................... F24F 11/79
62/186

(Continued)

FOREIGN PATENT DOCUMENTS

CN      102338446 A    2/2012
EP      2 781 850 A1   9/2014
(Continued)

OTHER PUBLICATIONS

Machine Translation of JP-2004-301343, retrieved Feb. 11, 2021 (Year: 2021).*
(Continued)

*Primary Examiner* — Eric S Ruppert
*Assistant Examiner* — Hans R Weiland
(74) *Attorney, Agent, or Firm* — Posz Law Group, PLC

(57) ABSTRACT

In an air-conditioning apparatus, in the case where a compressor is in operation, a fan is in operation, a wind guide plate is in a first state and a second heat exchanger operates as a condenser, when a detected temperature of target space for air-conditioning is higher than a set temperature for the target space and a detected temperature of a second heat exchanger is lower than or equal to a first reference temperature, a controller performs a first control to keep the compressor and the fan in operation and switch the state of the wind guide plate from the first state to a second state.

21 Claims, 12 Drawing Sheets

(51) Int. Cl.
*F25B 13/00* (2006.01)
*F25B 49/02* (2006.01)
*F24F 140/50* (2018.01)
*F24F 120/12* (2018.01)
*F24F 11/49* (2018.01)
*F24F 110/10* (2018.01)
*F24F 110/12* (2018.01)
*F24F 120/00* (2018.01)

(52) U.S. Cl.
CPC ........... *F24F 11/49* (2018.01); *F24F 2110/10* (2018.01); *F24F 2110/12* (2018.01); *F24F 2120/00* (2018.01); *F24F 2120/12* (2018.01); *F24F 2140/50* (2018.01); *F25B 2313/0314* (2013.01); *F25B 2700/2103* (2013.01)

(58) Field of Classification Search
CPC ... F24F 2120/12; F24F 2140/50; F25B 49/02; F25B 2313/0314; F25B 2700/2103
See application file for complete search history.

(56) References Cited

U.S. PATENT DOCUMENTS

| 2012/0012297 | A1  | 1/2012  | Nakagawa et al. |                |
|---|---|---|---|---|
| 2012/0097748 | A1* | 4/2012  | Kanaya          | F24F 11/79     |
|              |     |         |                 | 236/49.3       |
| 2014/0020860 | A1* | 1/2014  | Matsumoto       | F24F 11/79     |
|              |     |         |                 | 165/11.1       |
| 2014/0138043 | A1* | 5/2014  | Matsumoto       | F24F 11/79     |
|              |     |         |                 | 165/11.1       |
| 2015/0377242 | A1* | 12/2015 | Furuhashi       | F24F 11/79     |
|              |     |         |                 | 415/148        |
| 2019/0032950 | A1* | 1/2019  | Nakamura        | F24F 11/86     |

FOREIGN PATENT DOCUMENTS

| JP | H04-260812 A | 9/1992  |
|----|--------------|---------|
| JP | H09-196435 A | 7/1997  |
| JP | 2002-357352 A | 12/2002 |
| JP | 2004-301343 A | 10/2004 |
| JP | 2013-134027 A | 7/2013  |
| JP | 2013-190203 A | 9/2013  |
| JP | 2014-031907 A | 2/2014  |

OTHER PUBLICATIONS

Office Action dated Sep. 1, 2020 issued in corresponding CN patent application No. 201780085779.3( and English translation).
Extended European Search Report dated Mar. 5, 2020 issued in corresponding EP patent application No. 17904818.6.
International Search Report of the International Searching Authority dated Jul. 11, 2017 for the corresponding international application No. PCT/JP2017/014546 (and English translation).
Chinese Office Action dated Mar. 12, 2021, issued in corresponding Chinese Patent Application No. 201780085779.3 (and English Machine Translation).

* cited by examiner (a)

(b)

AIR-CONDITIONING APPARATUS

CROSS REFERENCE TO RELATED APPLICATION

This application is a U.S. national stage application of PCT/JP2017/014,546 filed on Apr. 7, 2017, the contents of which are incorporated herein by reference.

TECHNICAL FIELD

The present invention relates to air-conditioning apparatuses, and particularly, to an air-conditioning apparatus provided with an indoor unit including a wind guide plate.

BACKGROUND ART

An existing air-conditioning apparatus includes a temperature sensor that detects the temperature of air blown from an indoor unit, an upper wind guide plate, and a lower wind guide plate provided below the upper wind guide plate, and controls the angle of the upper wind guide plate and that of the lower wind guide plate based on the temperature detected by the temperature sensor (see, for example, Patent Literature 1). The air-conditioning apparatus described in Patent Literature 1 controls the angle of the upper wind guide plate and that of the lower wind guide plate, to thereby change the speed of air blown from the indoor unit. That is, by changing the speed of the blown air, the air-conditioning apparatus of Patent Literature 1 changes the distance by which the air is blown, to thereby reduce lowering of the comfort level of a person in indoor space.

During a heating operation of the air-conditioning apparatus, when the temperature of air blown from the indoor unit decreases, the person in the indoor space may feel that the air is cold. Therefore, in the air-conditioning apparatus of Patent Literature 1, when the temperature of the air blown from the indoor unit decreases during the heating operation of the air-conditioning apparatus, the upper wind guide plate and the lower wind guide plate are controlled to reduce the speed of the air blown from the indoor unit. Thus, the amount of air which is blown from the indoor unit to reach the person is reduced, thereby reducing lowering of the comfort level of the person.

Another existing air-conditioning apparatus includes a temperature sensor that detects the temperature of target space for air-conditioning, a sensor that detects the temperature of a person in the target space, and a wind guide plate (see, for example, Patent Literature 2). The air-conditioning apparatus described in Patent Literature 2 controls the angle of the wind guide plate based on the detected temperature of the target space and the detected temperature of the person.

CITATION LIST

Patent Literature

Patent Literature 1: Japanese Unexamined Patent Application Publication No. 9-196435
Patent Literature 2: Japanese Unexamined Patent Application Publication No. 4-260812

SUMMARY OF INVENTION

Technical Problem

Even when the speed of air blown from an indoor unit is reduced, the air still reaches a person in indoor space. Therefore, in the case where the temperature of air blown from the indoor unit decreases during the heating operation of an air-conditioning apparatus, even when the speed of the air blown from the indoor unit is reduced, it seems that the person will feel that the air is cold.

Furthermore, during the heating operation of the air-conditioning apparatus, the temperature (surface temperature) of the person increases along with the temperature of the target space. Therefore, during the heating operation of the air-conditioning apparatus, when the temperature of air blown from the indoor unit decreases, and the air reaches the person, it seems that the person will feel cold since the surface temperature of the person increases.

In such a manner, in the existing air-conditioning apparatuses, during the heating operation, the person in the indoor space may feel that blown air is cold, and the comfort of the person may be decreased.

The present invention has been made to solve the above problems, and an object of the invention is to provide an air-conditioning apparatus that can reduce lowering of the comfort level of a person in an indoor space during a heating operation.

Solution to Problem

An air-conditioning apparatus of an embodiment of the present invention includes: an indoor unit including an air outlet; a refrigerant circuit including a compressor, a first heat exchanger, a pressure-reducing device, and a second heat exchanger included in the indoor unit; a fan included in the indoor unit; a wind guide plate included in the indoor unit, and allowed to be rotated to be in a first state in which the wind guide plate causes air to be blown from the air outlet in a first direction, and to be in a second state in which the wind guide plate guides causes air to be blown from the air outlet in a direction upwardly inclined to the first direction, the wind guide plate being rotated such that a state of the wind guide plate changes between the first and second states; a first sensor configured to detect a temperature of air in target space for air-conditioning; a second sensor configured to detect a temperature of the second heat exchanger; and a controller configured to control the compressor, the fan and the wind guide plate. The controller performs a first control, in the case where the compressor is in operation, the fan is in operation, the wind guide plate is in the first state and the second heat exchanger operates as a condenser, when the detected temperature of the air in the target space is higher than a set temperature for the target space and the detected temperature of the second heat exchanger is lower than or equal to a first reference temperature. The first control being a control to keep the compressor and the fan in operation and switch the state of the wind guide plate from the first state to the second state.

Advantageous Effects of Invention

Because of the above configuration, the air-conditioning apparatus according to the embodiment of the present invention can reduce lowering of the comfort level of a person in indoor space during a heating operation.

DESCRIPTION OF EMBODIMENTS

An air-conditioning apparatus according to each of the embodiments of the present invention will be described below with reference to the drawings. The present invention is not limited to the embodiments provided as described below. In the following figures including FIG. 1, the relationship in size between components may differ from the actual one.

Embodiment 1

Figure 1A:
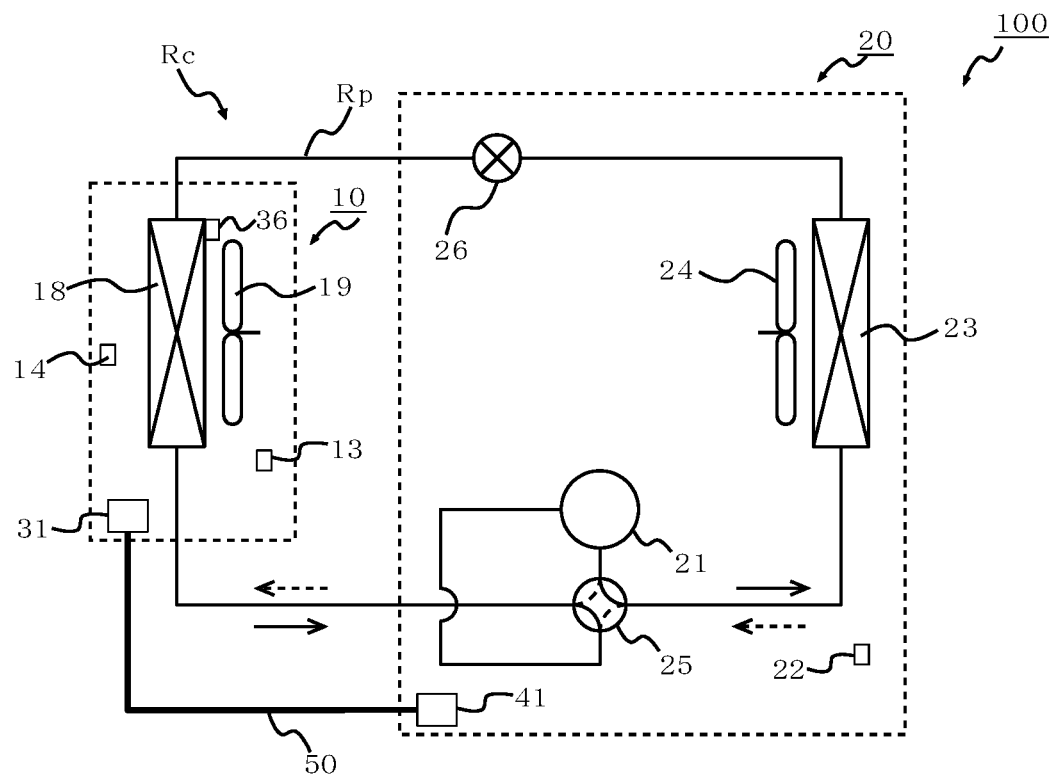
FIG. 1A illustrates a refrigerant circuit, etc., in an air-conditioning apparatus according to embodiment 1.

FIG. 1A illustrates a refrigerant circuit Rc, etc., in an air-conditioning apparatus 100 according to embodiment 1. In FIG. 1A, solid arrows indicate the flow of refrigerant during a cooling operation, and dotted arrows indicate the flow of refrigerant during a heating operation.

[Configuration of Air-Conditioning Apparatus 100]

The air-conditioning apparatus 100 includes an indoor unit 10 that supplies air-conditioning air to a target space to be air-conditioned (for example, a room in a house, a warehouse or a room in a building), and also includes an outdoor unit 201 provided with a compressor 21, a pressure-reducing device 26, etc. The indoor unit 10 and the outdoor unit 201 are connected to each other by a refrigerant pipe Rp. The air-conditioning apparatus 100 includes the refrigerant circuit Rc. The refrigerant circuit Rc includes the compressor 21, a four-way valve 25, an indoor heat exchanger 18, the pressure-reducing device 26, and an outdoor heat exchanger 23. The air-conditioning apparatus 100 includes an outdoor fan 24 that sends air to the outdoor heat exchanger 23, and also includes an indoor fan 19 that sends air to the indoor heat exchanger 18.

The indoor heat exchanger 18 corresponds to a first heat exchanger of the resent invention.

The outdoor heat exchanger 23 corresponds to a second heat exchanger of the present invention.

The indoor fan 19 corresponds to a fan of the present invention.

The air-conditioning apparatus 100 includes a controller 31 provided in the indoor unit 10 and a controller 41 provided in an outdoor unit 20. The controller 31 and the controller 41 are connected to each other by a connection cable 50. The controller 31 and the controller 41 communicate with each other via the connection cable 50. The air-conditioning apparatus 100 also includes a first detector 13 that detects the temperature of the target space, a second detector 14 that detects the temperature of a person who is present in the target space, a third detector 22 that detects the temperature of outside air, and a fourth detector 36 that detects the temperature of the indoor heat exchanger 18. In the following description, the temperature of the target space will also be referred to as indoor temperature. The temperature detected by the first detector 13, the temperature detected by the second detector 14 and the temperature detected by the fourth detector 36 are output to the controller 31. The temperature detected by the third detector 22 is output to the controller 41.

The first detector 13 of embodiment 1 corresponds to a first sensor of the present invention.

The fourth detector 36 of embodiment 1 corresponds to a second sensor of the present invention.

The second detector 14 of embodiment 1 corresponds to a third sensor of the present invention.

The second detector 14 of embodiment 1 corresponds to a fourth sensor of the present invention.

The second detector 14 of embodiment 1 corresponds to a fifth sensor of the present invention.

The third detector 22 of embodiment 1 corresponds to a sixth sensor of the present invention.

The controller 31 and the controller 41 each correspond to a controller of the present invention.

[Configuration of Indoor Unit 10]

Figure 1B:
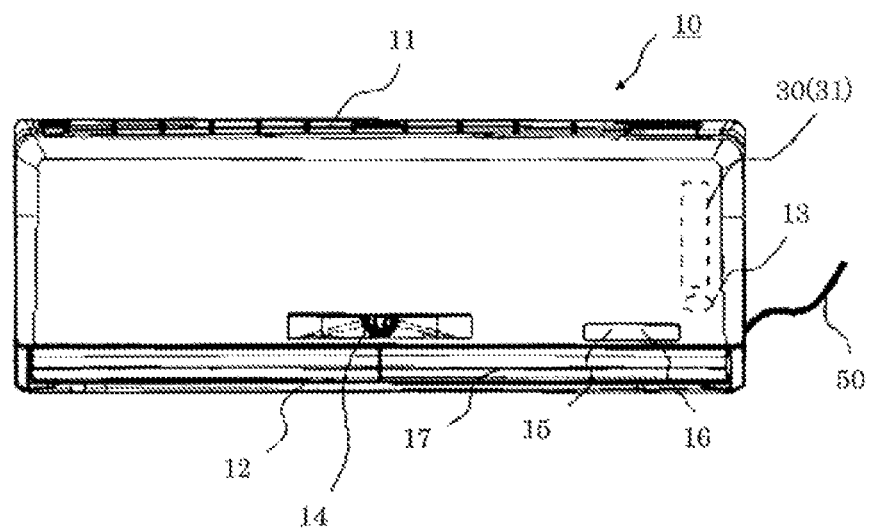
FIG. 1B is a front view of an indoor unit in the air-conditioning apparatus according to embodiment 1.

FIG. 1B is a front view of the indoor unit 10 in the air-conditioning apparatus 100 according to embodiment 1.

Figure 2A:
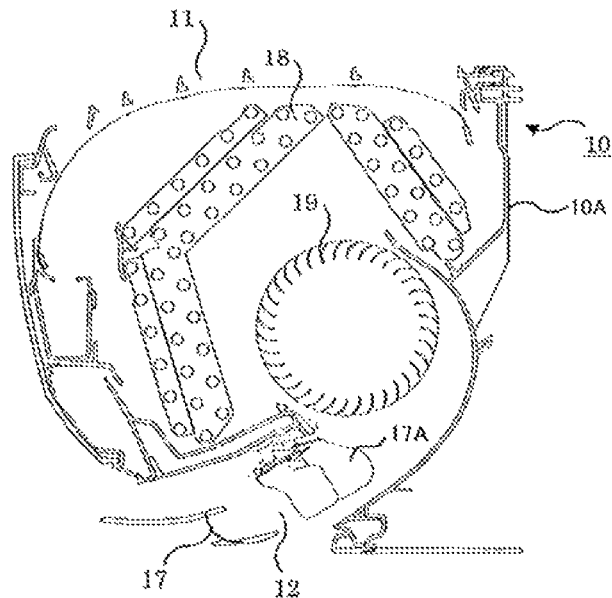
FIG. 2A is a cross-sectional view of the indoor unit in the air-conditioning apparatus according to embodiment 1.

FIG. 2A is a cross-sectional view of the indoor unit 10 in the air-conditioning apparatus 100 according to embodiment 1.

Figure 2B:
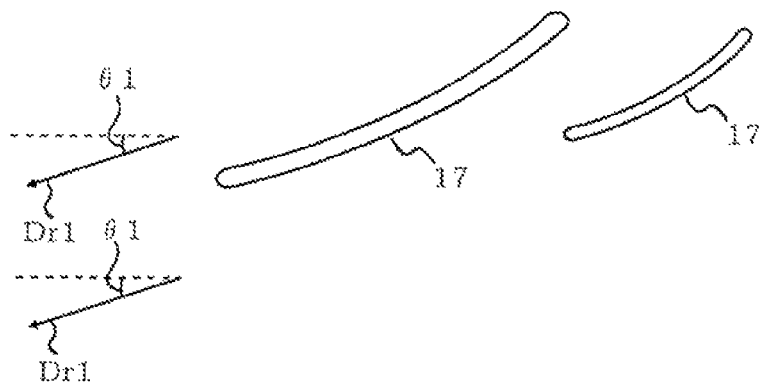
FIG. 2B is a schematic diagram illustrating a wind guide plate provided in the indoor unit in the air-conditioning apparatus according to embodiment 1.
Figure 2B:
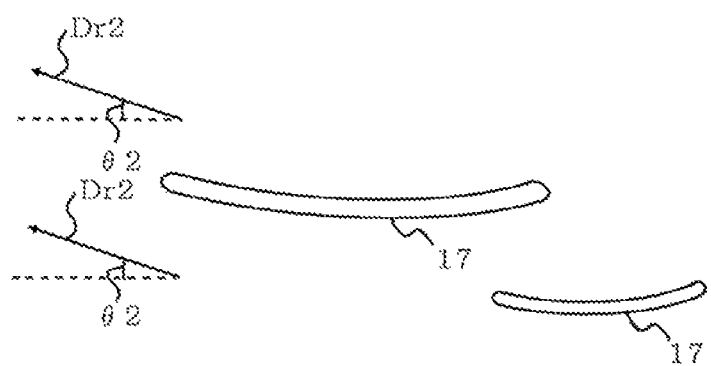
Figure 3:
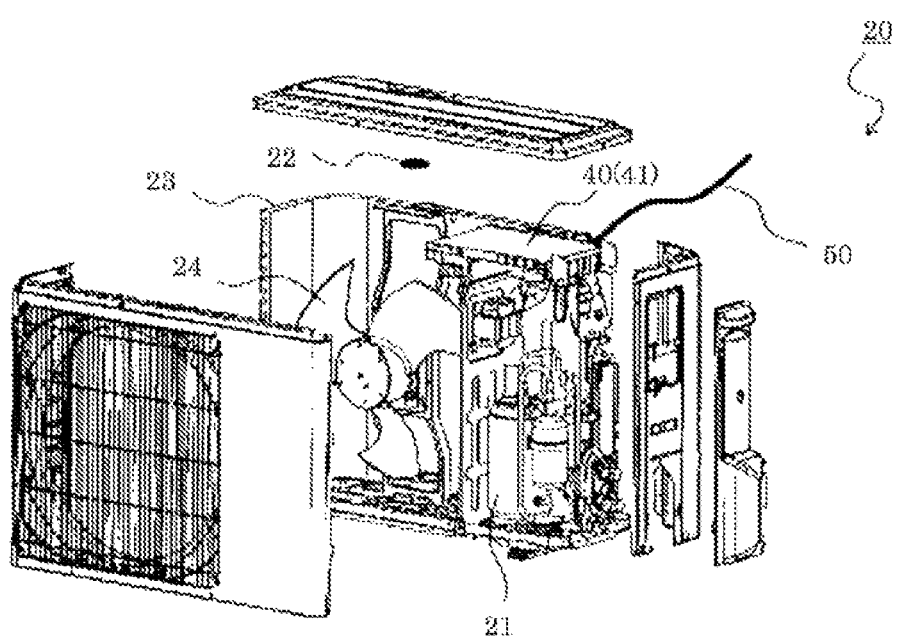
FIG. 3 is an exploded perspective view of an outdoor unit in the air-conditioning apparatus according to embodiment 1.

FIG. 2B is a schematic diagram illustrating a wind guide plate 17 provided in the indoor unit 10 in the air-conditioning apparatus 100 according to embodiment 1. FIG. 2B, (a), illustrates the case where the wind guide plate 17 is in a first state, and FIG. 2B, (b), illustrates the case where the wind guide plate 17 is in a second state.

In the indoor unit 10, an air inlet 11 and an air outlet 12 are provided. The indoor unit 10 includes the indoor fan 19 that sends air to the target space (for example, a room, a warehouse or a room in a building), and the indoor heat exchanger 18 that is supplied with the refrigerant. The indoor heat exchanger 18 operates as a condenser (radiator) during a heating operation, and operates as an evaporator during a refrigerant operation. In such a manner, the indoor unit 10 includes the indoor fan 19 and the indoor heat exchanger 18. Furthermore, the indoor unit 10 includes a remote control unit (not illustrated), a reception unit 15 that receives a signal output from the remote control unit, and a transmission unit 16 that transmits a signal to the remote control unit. The reception unit 15 and the transmission unit 16 are provided at, for example, a front surface of the indoor unit 10. The indoor unit 10 is also provided with an indoor electrical-component box 30. The controller 31 is provided in the indoor electrical-component box 30.

At the air outlet 12 of the indoor unit 10, the wind guide plate 17 and a wind guide plate 17A are provided. The wind guide plate 17 and a wind guide plate 17A are both rotatable. The wind guide plate 17 is located downstream of the wind guide plate 17A in the flow direction of air. The wind guide plate 17 adjusts the flow direction of air from the air outlet 12 in the vertical direction. The wind guide plate 17A adjusts the flow direction of air from the air outlet 12 in the horizontal direction.

As illustrated in FIG. 2B, the wind guide plate 17 is rotatable such that the state of the wind guide plate 17 changes between the first state and the second state. When the wind guide plate 17 is in the first state, air is blown from the air outlet 12 in a first direction DR1. An angle θ1 is the angle between the horizontal direction and the first direction DR1. That is, the first direction DR1 is inclined at the angle θ1 in a counterclockwise direction to the horizontal direction. The angle θ1 is greater than 0 degrees. When the wind guide plate 17 is in the first state, the indoor unit 10 blows air downwards. When the wind guide plate 17 is in the first state, air is blown toward space located at a lower level than the air outlet 12.

When the wind guide plate 17 is in the second state, air is blown from the air outlet 12 in a second direction DR2. The second direction Dr2 is upwardly inclined to the first direction Dr1. An angle θ2 is an angle between the horizontal direction and the second direction DR2. To be more specific, the second direction Dr2 is inclined at the angle θ2 in a clockwise direction to the horizontal direction. The angle θ1 is greater than or equal to 0 degrees. When the wind guide plate 17 is in the second state, the indoor unit 10 blows air upwards. When the wind guide plate 17 is in the second state, air is blown toward space located at substantially the same level as or at a higher level than the air outlet 12.

Figure 4:
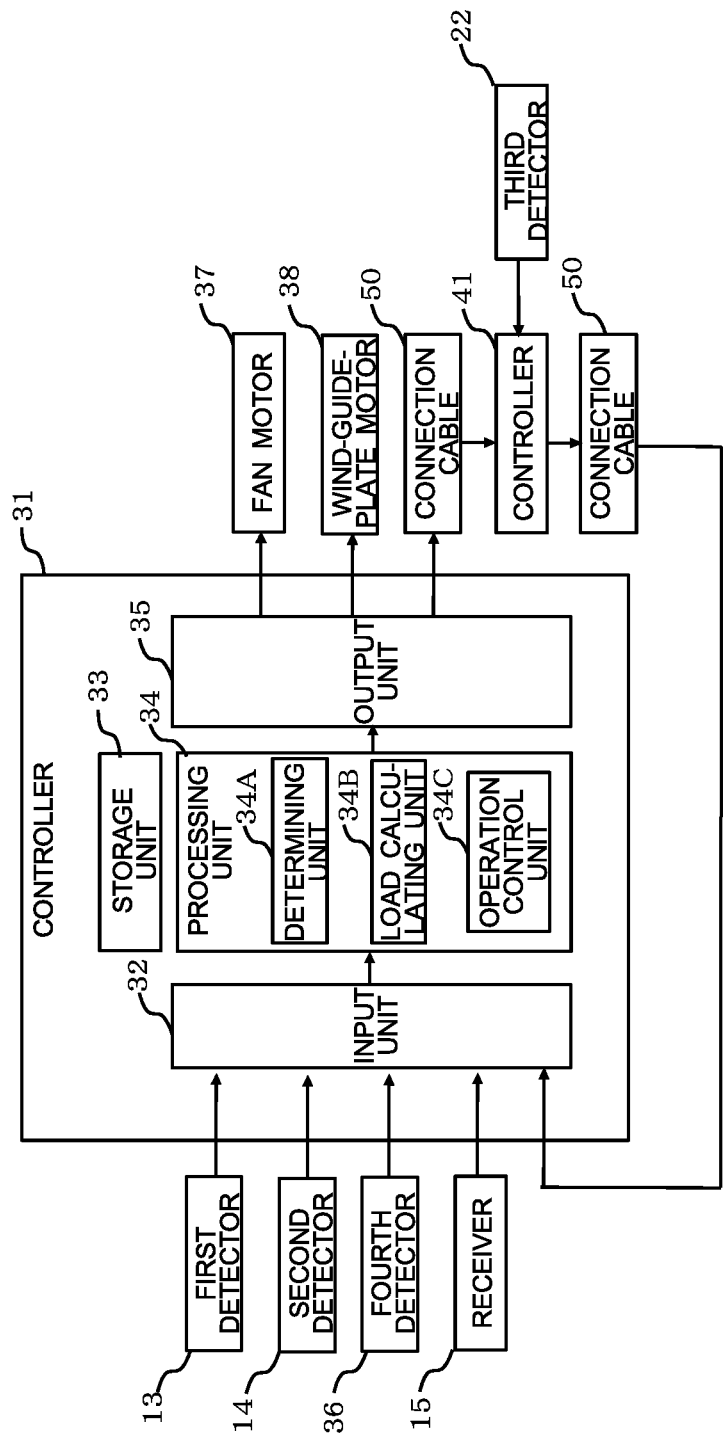
FIG. 4 is a functional block diagram of a controller in the air-conditioning apparatus according to embodiment 1.

The indoor fan 19 includes a fan and a fan motor 37 (see FIG. 4). The fan motor 37 causes the fan to rotate. The fan motor 37 is controlled by the controller 31. The indoor unit 10 includes a wind-guide-plate motor 38 (see FIG. 4) that causes the wind guide plate 17 to rotate. Furthermore, the indoor unit 10 also includes a wind-guide-plate motor that causes the wind guide plate 17A to rotate.

The indoor unit 10 includes the first detector 13, the second detector 14, and the fourth detector 36. The first detector 13 is an indoor temperature sensor that detects an indoor temperature Ti. As the first detector 13, for example, a thermistor may be used. The second detector 14 is a sensor that detects a human-body-surface temperature Tj of the person in the target space. In addition to the human-body-surface temperature Tj, the second detector 14 detects a floor-surface temperature Ty of the target space and a ceiling-surface temperature Tt of the target space. The second detector 14 is provided at the front surface of the indoor unit 10. As the second detector 14, for example, an infrared sensor can be used. The fourth detector 36 is a temperature sensor that detects a temperature Tn of the indoor heat exchanger 18. The fourth detector 36 is attached to, for example, a heat transfer pipe provided in the indoor heat exchanger 18. As the fourth detector 36, for example, a thermistor, can be used.

[Configuration of Outdoor Unit 20]

For example, the outdoor unit 201 is installed outdoors and, for example, on the roof of a building. The outdoor unit 201 includes the compressor 21 that compresses the refrigerant, the four-way valve 25 connected to the compressor 21, and the outdoor heat exchanger 23 connected to the four-way valve 25. The outdoor heat exchanger 23 operates as an evaporator during the heating operation, and operates as a condenser (radiator) during the refrigerant operation. The outdoor unit 201 includes the outdoor fan 24 that is attached to the outdoor heat exchanger 23 and that sends air to the outdoor heat exchanger 23, and also includes the pressure-reducing device 26 that reduces the pressure of refrigerant.

The outdoor unit 201 includes an outdoor electrical-component box 40. The controller 41 is provided in the outdoor electrical-component box 40. The controller 41 controls the compressor 21, the four-way valve 25, the pressure-reducing device 26, and the outdoor fan 24.

[Controller]

FIG. 4 is a functional block diagram of the controller 31 in the air-conditioning apparatus 100 according to embodiment 1. The controller 31 will be described with reference to the functional block diagram of FIG. 4.

The controller 31 includes an input unit 32, a storage unit 33, a processing unit 34, and an output unit 35.

The input unit 32 receives an output of the first detector 13, an output of the second detector 14, and an output of the fourth detector 36. The output of the first detector 13 includes information on the indoor temperature Ti. The output of the second detector 14 includes information on the human-body-surface temperature Tj, information on the floor-surface temperature Ty of the target space and information on the ceiling-surface temperature Tt of the target space. The output of the fourth detector 36 includes information on the temperature Tn of the indoor heat exchanger 18. The input unit 32 also receives information output from the controller 41, for example, an output of the third detector 22 from the controller 41. The output of the third detector 22 includes information on an outside air temperature To. The input unit 32 receives an output of the reception unit 15. The output of the reception unit 15 includes, for example, information on a set temperature T0 for the target space.

The storage unit 33 has a function of storing various information.

The processing unit 34 has various calculating functions. The processing unit 34 includes a determining unit 34A, a load calculating unit 34B, and an operation control unit 34C.

The determining unit 34A has a function of comparing an acquired indoor temperature Ti with an acquired set temperature T0.

The determining unit 34A has a function of comparing an acquired temperature Tn with a temperature T1. The temperature T1 is, for example, 40 degrees C. The temperature T1 is a predetermined temperature stored in the storage unit 33.

The determining unit 34A has a function of comparing a difference between the acquired indoor temperature T1 and the set temperature T0 with a temperature T2. The temperature T2 is, for example, 1 degree C. The temperature T2 is a predetermined temperature stored in the storage unit 33.

The determining unit 34A has a function of determining whether an air-conditioning load Q' acquired from the load calculating unit 34B is higher than a predetermined threshold value or not.

The determining unit 34A has a function of comparing a difference between a human-body-surface temperature Tj and a reference human-body-surface temperature Tj0 with a temperature T3. The temperature T3 is, for example, 1 degree C. The temperature T3 and the reference human-body-surface temperature Tj0 are predetermined temperatures stored in the storage unit 33.

The determining unit 34A has a function of comparing a difference between a ceiling-surface temperature Tt and a floor-surface temperature Ty with a temperature T4. Also, the determining unit 34A has a function of comparing a difference between the ceiling-surface temperature Tt and the floor-surface temperature Ty with a temperature T5. The temperature T4 is, for example, 1 degree C. The temperature T5 is, for example, 0 degrees C. The temperature T4 and the temperature T5 are predetermined temperatures stored in the storage unit 33.

The load calculating unit 34B calculates an amount H of air to be blown from the air outlet 12 based on a rotation speed of the fan motor 37. The rotation speed of the fan motor 37 is included in control information for controlling the fan motor 37. The storage unit 33 stores the following equation (1) or a table corresponding to the equation (1).

$$\text{Exhibiting capacity } Q(kW) = Cp \times (H/60) \times (Tm1 - Tm2) \times (1/v) \tag{1}$$

Specific heat Cp of dry air at constant pressure is 1.006 kJ/(kg·K).

The amount H of air is a value calculated by the load calculating unit 34B. The unit of the amount H of air is m³/min.

An output-airflow temperature Tm1 is the temperature Tn of the indoor heat exchanger 18.

An input-airflow temperature Tm2 is the indoor temperature Ti.

A specific volume v of indoor air can be acquired based on, for example, the indoor temperature T1. The load calculating unit 34B may calculate the specific volume v based on, for example, the indoor temperature Ti. Alternatively, the load calculating unit 34B may acquire the specific volume v from the storage unit 33. The unit of the specific volume v is m³/kg.

The load calculating unit 34B calculates the exhibiting capacity Q based on the acquired amount H of air, the acquired indoor temperature Ti, the acquired temperature Tn, and the equation (1).

Furthermore, the storage unit 33 stores the following equation (2) or a table corresponding to the equation (2).

$$\text{Air-conditioning load } Q'(kW/\text{deg}) = (Ti - To) \times Q \tag{2}$$

The load calculating unit 34B calculates an air-conditioning load Q' based on the acquired indoor temperature Ti, the acquired outside air temperature To, the acquired exhibiting capacity Q, and the equation (2).

The operation control unit 34C has a function of controlling various actuators such as the fan motor 37 and the wind-guide-plate motor 38. For example, information on the rotation speed of the fan motor 37 is output from the operation control unit 34C to the fan motor 37 via the output unit 35. Furthermore, control information for controlling the wind-guide-plate motor 38 is output from the operation control unit 34C to the fan motor 37 via the output unit 35.

The output unit 35 outputs, for example, the control information for controlling the fan motor 37 and the control information for controlling the wind-guide-plate motor 38. The output unit 35 also outputs information to the controller 41. When receiving a power-up signal from the remote control unit, the reception unit 15 outputs power-up information to the controller 31. The operation control unit 34C transmits a control signal for controlling, for example, the compressor 21 to the controller 41 via the output unit 35 and the connection cable 50. When receiving the control signal, the controller 41 causes, for example, the compressor 21 to start operating.

Each of the functional units included in the controllers 31 and 41 is dedicated hardware or a micro processing unit (MPU) that executes a program stored in a memory. In the case where the controllers 31 and 41 are dedicated hardware, these controllers each correspond to, for example, a single circuit, a composite circuit, an application specific integrated circuit (ASIC), a field-programmable gate array (FPGA) or a combination thereof. As the functional units included in the controller 31 and the controller 41, respective hardware may be used or single hardware may be used. In the case where the controllers 31 and 41 are MPUs, the functions to be fulfilled by the controllers 31 and 41 are each executed by software, firmware or a combination of software and firmware. Software and firmware are described as programs and stored in the memory. The MPUs read and execute the programs stored in the memory to fulfill the functions of the controllers 31 and 41. The memory is, for example, a nonvolatile or volatile semiconductor memory, such as a RAM, a ROM, a flash memory, an EPROM or an EEPROM.

Control Flow in Embodiment 1

Figure 5:
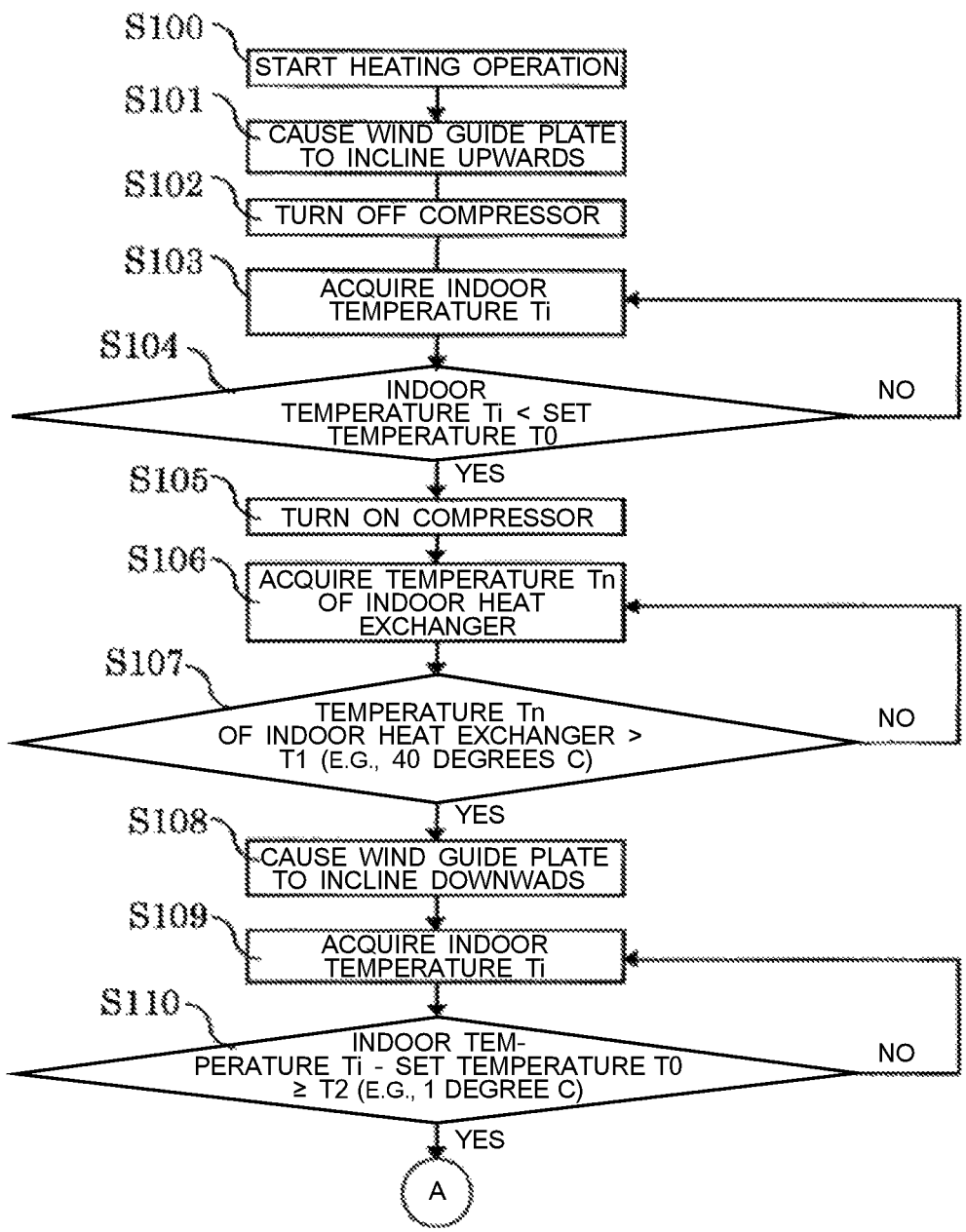
FIG. 5 is a flowchart of a control including a first control and a second control in the air-conditioning apparatus according to embodiment 1.
Figure 6:
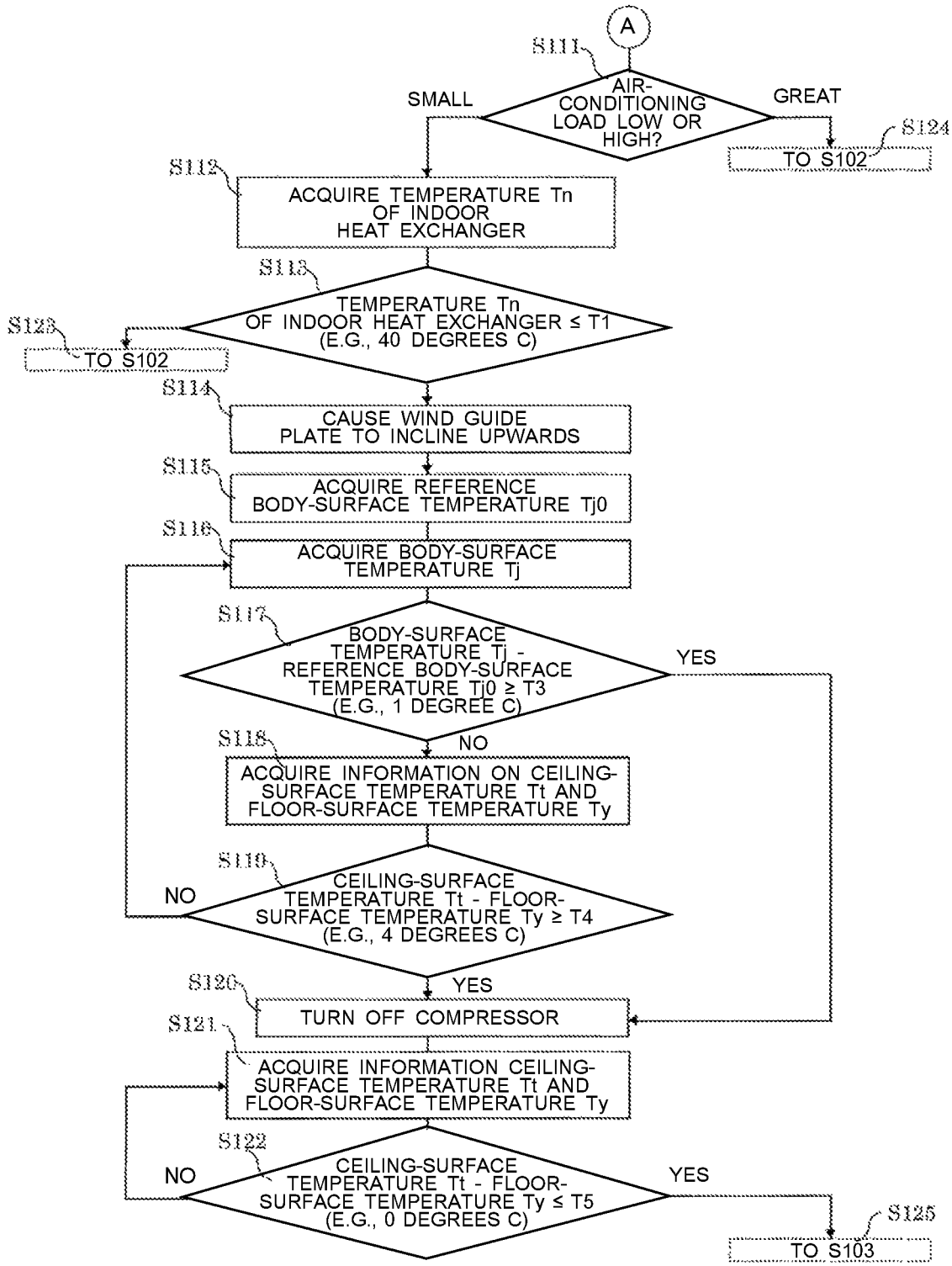
FIG. 6 indicates steps which follow steps in the control, which are indicated in the flowchart of FIG. 5.

FIG. 5 is a flowchart of a control including a first control and a second control in the air-conditioning apparatus 100 according to embodiment 1. FIG. 6 indicating steps that follow the steps in the control, which are indicated in the flowchart of FIG. 5. In the following description which is made with reference to FIGS. 5 and 6, the controllers 31 and 41 are collectively referred to as a controller Cnt.

(Step S100: Start)

The controller Cnt causes the heating operation to start.

(Step S101)

The controller Cnt causes the wind guide plate 17 to be set in the second state.

(Step S102)

The controller Cnt causes the compressor 21 to stop.

(Step S103: Acquisition 1 of Indoor Temperature Ti)

The controller Cnt acquires an indoor temperature Ti from the first detector 13.

(Step S104: Determination of Whether to Start Operation of Compressor 21)

The controller Cnt determines whether the indoor temperature Ti is lower than the set temperature T0 or not. When the indoor temperature Ti is lower than the set temperature T0, the process proceeds to step S105. When the indoor temperature Ti is higher than or equal to the set temperature T0, the process returns to step S103. When the indoor temperature Ti is lower than the set temperature, warm air does not need to be supplied to the target space. Therefore, the indoor unit 10 makes the determination in step S104 such that the comfort of the person in the target space is not decreased.

(Step S105)

The controller Cnt causes the compressor 21 to start operating. Also, the controller Cnt causes the indoor fan 19 to start operating. In the case where the indoor fan 19 is already in operation when step S105 is reached, the controller Cnt keeps the indoor fan 19 in operation.

(Step S106: Acquisition 1 of Temperature Tn of Indoor Heat Exchanger 18)

The controller Cnt acquires a temperature Tn of the indoor heat exchanger 18 from the fourth detector 36.

(Step S107)

The controller Cnt determines whether the temperature Tn of the indoor heat exchanger 18 is higher than the temperature T1 or not. When the temperature Tn of the indoor heat exchanger 18 is higher than the temperature T1, the process proceeds to step S108. When the temperature Tn of the indoor heat exchanger 18 is lower than or equal to the temperature T1, the process returns to step S106. Since the compressor 21 is in the stopped state, the temperature of air blown from the indoor unit 10 is low. Thus, the indoor unit 10 makes the determination in step S107 to prevent the person in the target space from feeling cold.

(Step S108: Downward Blowing Operation)

The controller Cnt causes the wind guide plate 17 to be set in the first state. Thus, air is blown downwards from the indoor unit 10. That is, warm air is sent toward the person in the target space and a floor. It should be noted that in the case where the wind guide plate 17 is already in the first state when step S108 is reached, the controller Cnt keeps the wind guide plate 17 in the first state. For example, in the case where the process returns to step S102 from step S123 or step S124, the controller Cnt keeps the wind guide plate 17 in the first state. When the control in step S108 is performed, the indoor unit 10 starts to blow air downwards as a downward blowing operation. In the downward blowing operation, warm air is sent toward the person in the target space, and the indoor temperature Ti is raised.

(Step S109: Acquisition 2 of Indoor Temperature Ti)

The controller Cnt acquires the indoor temperature Ti from the first detector 13. When given time elapses from time when the indoor temperature Ti is acquired in step S103, the indoor temperature Ti is assumed to vary. Therefore, the indoor temperature Ti is re-acquired in step S109.

(Step S110: Change to Low-Capacity Operation)

The controller Cnt determines whether the difference between the indoor temperature Ti and the set temperature T0 is greater than or equal to the temperature T2 or not. When the difference is greater than or equal to the temperature T2, the process proceeds to step S111. When the difference is smaller than the temperature T2, the process returns to step S109. When steps S109 and S110 are continuously repeated as a loop, the indoor temperature Ti approaches the set temperature T0. This loop continues even when the indoor temperature Ti exceeds the set temperature T0. When the indoor temperature Ti becomes higher than or equal to the sum of the set temperature T0 and the temperature T2, that is, when the difference becomes greater than or equal to the temperature T2, the controller Cnt exists the loop.

While the loop of steps S109 and S110 is being carried out, the controller Cnt reduces the rotation speed of the compressor 21. That is, the heating capacity of the indoor unit 10 decreases while the loop of steps S109 and S110 is being carried out. This means that when the controller Cnt exits the loop, the indoor unit 10 enters a low-capacity operation mode.

(Step S111: Determination of Air-Conditioning Load)

The determining unit 34A determines whether the air-conditioning load Q' acquired from the load calculating unit 34B is higher than the predetermined threshold value or not. When the air-conditioning load Q' is higher than the predetermined threshold value, the process proceeds to step S124. When the air-conditioning load Q' is lower than or equal to the predetermined threshold value, the process proceeds to step S112. The indoor unit 10 makes the above determination regarding the air-conditioning load Q' to determine whether heat can be easily accumulated in the indoor unit 10 or not. As can be seen from equation (2) as indicated above, the air-conditioning load Q' has a correlation with the thermal insulation properties of a building. If the building has low thermal insulation properties, outside air easily flows into indoor space, thus causing the air-conditioning load Q' to increase. In the case where the indoor unit 10 is installed in a super-insulated house or apartment, the air-conditioning load Q' tends to decrease. When the air-conditioning load Q' is low, heat can be easily accumulated. This is because heat does not easily escape from the indoor space to outdoor space.

(Step S112: Acquisition 2 of Temperature Tn of Indoor Heat Exchanger 18)

The controller Cnt acquires the temperature Tn of the indoor heat exchanger 18 from the fourth detector 36.

(Step S113: Determination of Whether to Change Operation from Downward Blowing Operation Changes to First Upward Blowing Operation)

The controller Cnt determines whether the temperature Tn of the indoor heat exchanger 18 is lower than or equal to the temperature T1 or not. When the temperature Tn of the indoor heat exchanger 18 is lower than or equal to the temperature T1, the process proceeds to step S114. In the case where step S113 is reached, it means that a condition in which the indoor temperature Ti exceeds the set temperature is satisfied in step S110. If the compressor 21 is stopped for the reason that the above condition is satisfied, this causes the compressor 21 to more frequently stop and start as a stop-start operation. If the number of stops and starts of the compressor 21, that is, the number of times the stop-start operation is performed, increases, fluctuations in the sensory temperature for the person in the target increase, thus decreasing the comfort of the person, and the energy consumption greatly increases since a large amount of power is consumed when the compressor 21 restarts. That is why when the process proceeds from step S113 to step S114, the compressor 21 continues to operate.

Furthermore, when step S113 is reached, since the indoor unit 10 have entered the low-capacity operation mode in the loop of steps S109 and S110, the temperature of air blown out of indoor unit 10 has decreased. Thus, even when the compressor 21 continues to operate, in the case where the wind guide plate 17 is in the first state, the person in the target space will feel cold, thus decreasing the comfort of the person. Thus, in order to prevent the comfort of the person from being decreased, the process proceeds to step S114 and the controller Cnt causes the wind guide plate 17 to be set in the second state. Thereby, the comfort of the person is prevented from being decreased. In addition, heat can be easily accumulated in an upper region of the target space.

Also, when step S113 is reached, the condition in which the air-conditioning load Q' is low (the building is a super-insulated house) is satisfied in step S111. Thus, even when the operation mode of the indoor unit 10 has changed to the low-capacity operation mode, heat does not easily escape to the outdoor space, and heat can thus be easily accumulated.

When the temperature Tn of the indoor heat exchanger 18 is higher than the temperature T1, the process proceeds to step S123. When the temperature Tn of the indoor heat exchanger 18 is higher than the temperature T1, the temperature of air blown from the indoor unit 10 is high. Therefore, even when the wind guide plate 17 is in the second state, the indoor temperature Ti is further increased with respect to the set temperature, and the comfort of the person may be decreased. Thus, when the temperature Tn of the indoor heat exchanger 18 is higher than the temperature T1, the process proceeds to step S123 and the controller Cnt causes the compressor 21 to stop.

(Step S114: First Upward Blowing Operation)

The controller Cnt performs the first control. That is, the controller Cnt causes the wind guide plate 17 to be set in the second state. The wind guide plate 17 is set in the second state, and the indoor unit 10 causes heat to accumulate in the target space. Although the indoor unit 10 starts to perform the downward blowing operation in step S108, the indoor unit 10 starts to perform the upward blowing operation in step S114. That is, in step S114, the operation of the indoor unit 10 changes from the downward blowing operation to the first upward blowing operation. In the first upward blowing operation, warm air having a temperature lower than or equal to the temperature T1 is supplied to the upper region of the target space. Thereby, heat is accumulated in the upper region of the target space.

(Step S115: Acquisition of Reference Human-Body-Surface Temperature Tj0)

The second detector 14 performs scanning to detect a human-body-surface temperature of the person in the target space. The detected human-body-surface temperature is stored as a reference human-body-surface temperature Tj0 in the storage unit 33. That is, in step S115, the controller Cnt acquires the reference human-body-surface temperature Tj0.

(Step S116)

The controller Cnt acquires the human-body-surface temperature Tj from the second detector 14.

(Step S117: Determination 1 of Whether to Change Operation from First Upward Blowing Operation Changes to Second Upward Blowing Operation in Embodiment 1)

The controller Cnt determines whether the difference between the human-body-surface temperature Tj and the reference human-body-surface temperature Tj0 is greater than or equal to the temperature T3 or not. When the difference is greater than or equal to the temperature T3, the process proceeds to step S120. Specifically, the process of the indoor unit 10 proceeds from step S117 to step S120, and the controller Cnt causes the compressor 21 to stop. That is, the controller Cnt performs the second control. When the difference is smaller than the temperature T3, the process proceeds to step S118.

In the first upward blowing operation, air having a temperature lower than or equal to the temperature T1 is supplied to the target space. To be more specific, the air is supplied to the upper region of the target space. Thus, the indoor temperature Ti does not easily change. Therefore, in the first upward blowing operation, it is hard to grasp the comfort of the person in the target space based on the indoor temperature Ti. Therefore, in step S117, the comfort of the person is grasped based on the human-body-surface temperature Tj. When the difference is greater than or equal to the temperature T3, the process proceeds to step S120 and the controller Cnt causes the compressor 21 to stop, thereby preventing the person from feeling hot. When the process proceeds from step S117 to step S120, the indoor unit 10 starts to perform the second upward blowing operation. That is, the controller Cnt changes the blowing operation from the first upward blowing operation to the second upward blowing operation. Because the compressor 21 is in the stopped state, the second upward blowing operation is an air-sending operation. In the second upward blowing operation, air is supplied to the accumulated heat, whereby the accumulated heat is circulated in the target space. Thereby, warm air can be supplied to the person even when the compressor 21 is in the stopped state. A problem of the heating operation in the related art resides in that the comfort of the person is decreased while the compressor is in the stopped state. As described above, the indoor unit 10 can supply warm air to the person in the target space even while the compressor 21 is in the stopped state, thus reducing lowering of the comfort level of the person.

Furthermore, in the heating operation in the related art, when the indoor temperature falls below the set temperature after the compressor is stopped, the operation of the compressor is restarted. As a result, the number of stops and starts of the compressor is increased. In the present embodiment, as described above, in the second upward blowing operation, the accumulated heat is circulated in the target space, and the indoor temperature Ti does not easily fall below the set temperature T0. In the indoor unit 10, even in the case where the process proceeds from step S117 to step S120, and proceeds to step S104 via steps S121, S122, S125 and S103, the process does not easily proceed to step S105. That is, in the indoor unit 10, the accumulated heat is circulated in the target space, and thus the indoor temperature Ti does not easily fall below the set temperature T0. Thus, the loop of steps S103 and S104 is easily carried out. Therefore, the indoor unit 10 can reduce the number of stops and starts of the compressor 21, thus reducing the energy consumption.

When the difference is smaller than the temperature T3, the indoor unit 10 continues to perform the first upward blowing operation.

(Step S118: Acquisition 1 of Floor-Surface Temperature Ty and Ceiling-Surface Temperature Tt)

The second detector 14 scans the floor surface and the ceiling surface of the target space. The controller Cnt acquires a floor-surface temperature Ty of the target space and a ceiling-surface temperature Tt of the target space from the second detector 14.

(Step S119: Determination 2 of Whether to Change Blowing Operation from First Upward Blowing Operation to Second Upward Blowing Operation in Embodiment 1)

The controller Cnt determines whether the difference between the ceiling-surface temperature Tt of the target space and the floor-surface temperature Ty of the target space is greater than or equal to the temperature T4 or not. When the difference is greater than or equal to the temperature T4, the process proceeds to step S120. The process of the indoor unit 10 proceeds from step S119 to step S120, and the controller Cnt stops the compressor 21. In other words, the controller Cnt performs the second control. When the difference is smaller than the temperature T4, the process returns to step S116.

During the first upward blowing operation, because warm air is supplied to the upper region of the target space, the temperature of the ceiling surface becomes higher than the temperature of the floor surface. When the temperatures of the upper region and lower region of the target space differ from each other, the comfort of the person in the target space is decreased. Therefore, when the difference is greater than or equal to the temperature T4, the process proceeds to step S120 and the controller Cnt causes the compressor 21 to stop. When the process proceeds from step S119 to step S120, the indoor unit 10 starts to perform the second upward blowing operation. That is, the operation of the indoor unit 10 changes from the first upward blowing operation to the second upward blowing operation (the air-sending operation). When the indoor unit 10 starts the second upward blowing operation, the accumulated heat is circulated in the target space, whereby the difference between the temperatures of the upper region and lower region of the target space is reduced to be smaller. The advantage of the second upward blowing operation in step S119 is the same as or similar to that of the second upward blowing operation in step S117.

When the difference is smaller than the temperature T4, the process returns to step S116, and the indoor unit 10 continues to perform the first upward blowing operation.
(Step S120)

The controller Cnt causes the compressor 21 to stop.
(Step S121: Acquisition 2 of Floor-Surface Temperature Ty and Ceiling-Surface Temperature Tt)

The second detector 14 scans the floor surface and the ceiling surface of the target space. The controller Cnt acquires a floor-surface temperature Ty of the target space and a ceiling-surface temperature Tt of the target space from the second detector 14.
(Step S122: Determination of Whether Accumulated Heat is Circulated)

The controller Cnt determines whether the difference between the ceiling-surface temperature Tt of the target space and the floor-surface temperature Ty of the target space is smaller than or equal to the temperature T5 or not. When the difference is smaller than or equal to the temperature T5, the process proceeds to step S125. When the difference is greater than the temperature T5, the process returns to step S121.

When the difference is smaller than or equal to the temperature T5, it means that the accumulated heat is sufficiently circulated in the target space by the second upward blowing operation (the air-sending operation). In this case, the process of the indoor unit 10 proceeds to step S104 via steps S125 and S103. The advantage of the second upward blowing operation in step S122 is the same as or similar to that of the second upward blowing operation in step S117.

(Steps S123 and S124)
The process of the controller Cnt proceeds to step S102.
(Step S125)
The process of controller Cnt proceeds to step S103.
[Temperatures T1 to T5]

The controller Cnt can change the temperature T1, the temperature T2, the temperature T3, the temperature T4, and the temperature T5. The temperature T4 can be set based on the magnitude of the air-conditioning load Q'. The temperature T4 is set to 5 degrees C. when the air-conditioning load Q' falls within a first range, is set to 4 degrees C. when the air-conditioning load Q' falls within a second range, and is set to 3 degrees C. when the air-conditioning load Q' falls within a third range. The second range is wider than the first range, and the third range is wider than the second range. That is, the controller Cnt sets the temperature T4 to a low value when the acquired air-conditioning load Q' is high, and sets the temperature T4 to a high value when the acquired air-conditioning load Q' is low.

The temperature T1 of embodiment 1 corresponds to a first reference temperature of the present invention.

The temperature T3 of embodiment 1 corresponds to a first difference of the present invention.

The temperature T4 of embodiment 1 corresponds to a second difference of the present invention.

The temperature T5 of embodiment 1 corresponds to a third difference of the present invention.

The reference human-body-surface temperature Tj0 of embodiment 1 corresponds to a second reference temperature of the present invention.
[Timing t1 of Performance of First Control]

Figure 7A:
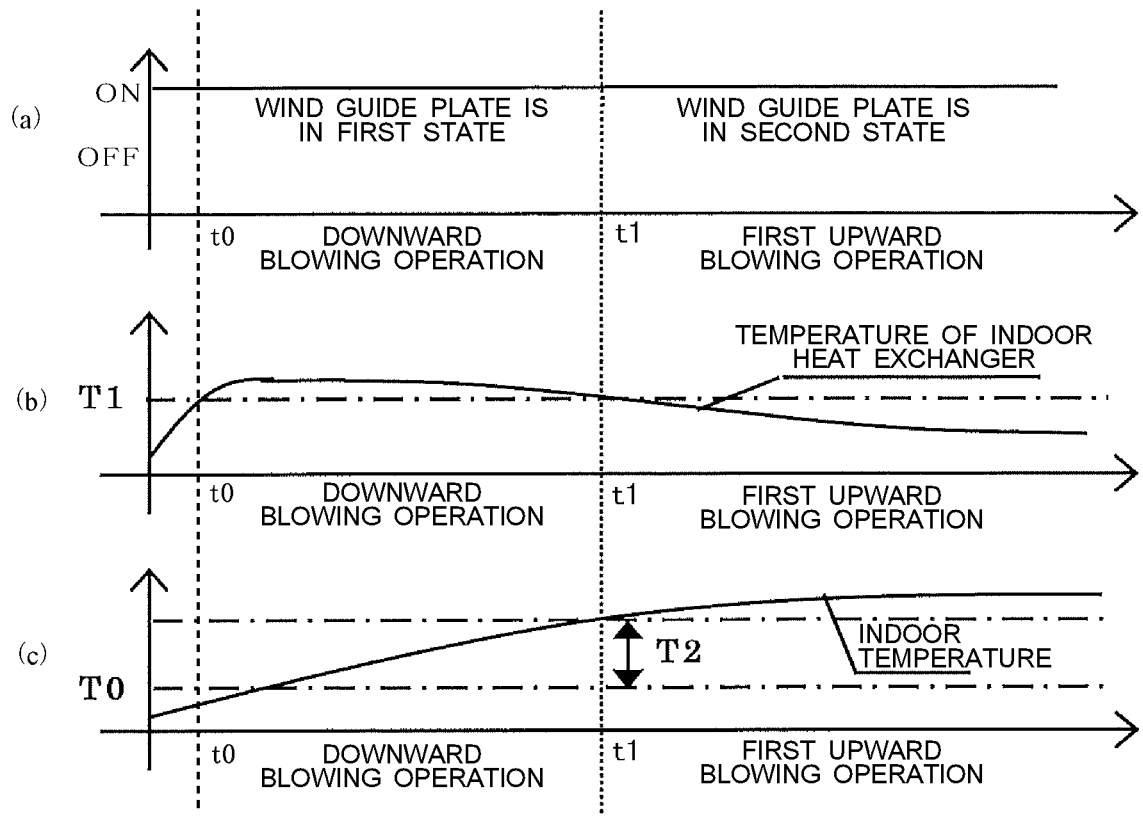
FIG. 7A indicates timing at which the first control is performed during a downward blowing operation of the air-conditioning apparatus according to embodiment 1, with FIG. 7A, (a) indicating the compressor operation, FIG. 7A, (b) indicating a temperature change in the indoor heat exchanger, and FIG. 7A, (c) indicating a temperature change in the target space.
Figure 7B:
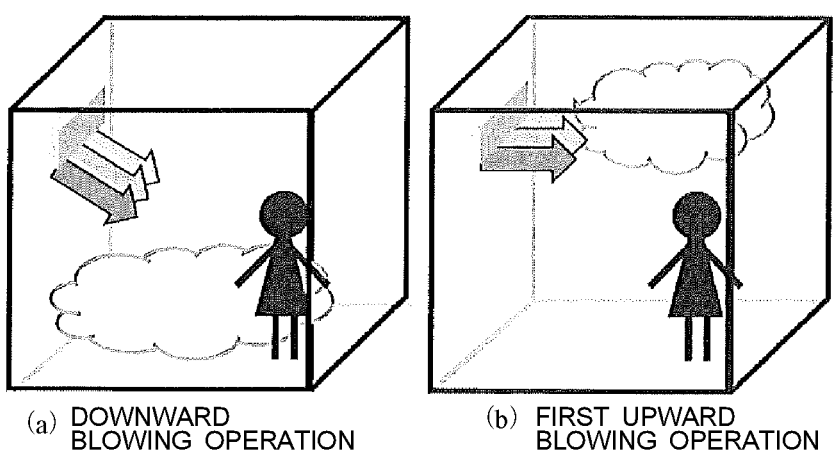
FIG. 7B, (a), illustrates an airflow during the blowing operation, and FIG. 7B, (b), illustrates an airflow during a first upward blowing operation.

FIG. 7A indicates timing t1 at which the first control is performed during the downward blowing operation of the air-conditioning apparatus 100 according to embodiment 1. FIG. 7B, (a), illustrates the airflow during the blowing operation, and FIG. 7B, (b), illustrates the airflow during the first upward blowing operation. FIG. 7A, (a), indicates whether the compressor 21 is in operation (ON) or in a stopped state (OFF). FIG. 7A, (b), indicates a temperature change in the indoor heat exchanger 18. FIG. 7A, (c), indicates a temperature change in the target space. The horizontal axis in each of (a) to (c) in FIG. 7 indicates time.

As illustrated in FIG. 7A, (b), when the indoor unit 10 starts to perform the heating operation, the temperature of the indoor heat exchanger 18 increases. When the temperature of the indoor heat exchanger 18 becomes higher than the temperature T1, the wind guide plate 17 is set in the first state. The timing at which the wind guide plate 17 is set in the first state is indicated as timing t0 in FIG. 7A. When the wind guide plate 17 is set in the first state, the indoor unit 10 starts to perform the downward blowing operation. As illustrated in FIG. 7A, (c), when the indoor unit 10 starts to perform the downward blowing operation, the indoor temperature increases. Then, when the indoor temperature approaches the sum of the set temperature T0 and the temperature T2, the rotation speed of the compressor 21 decreases, and the indoor unit 10 is operated in the low-capacity operation mode. When the indoor temperature becomes higher than or equal to the sum of the set temperature T0 and the temperature T2 (see FIG. 7A, (c)) or the temperature of the indoor heat exchanger 18 becomes lower than or equal to the temperature T1 (see FIG. 7A, (b)), the controller Cnt performs the first control. The timing at which the first control is performed is indicated as timing t1 in FIG. 7A. When the controller Cnt performs the first control, the state of the wind guide plate 17 is changed from the first state to the second state. In other words, the indoor unit 10 starts to perform the first upward blowing operation.

[Timing t2 of Performance of Second Control]

Figure 8A:
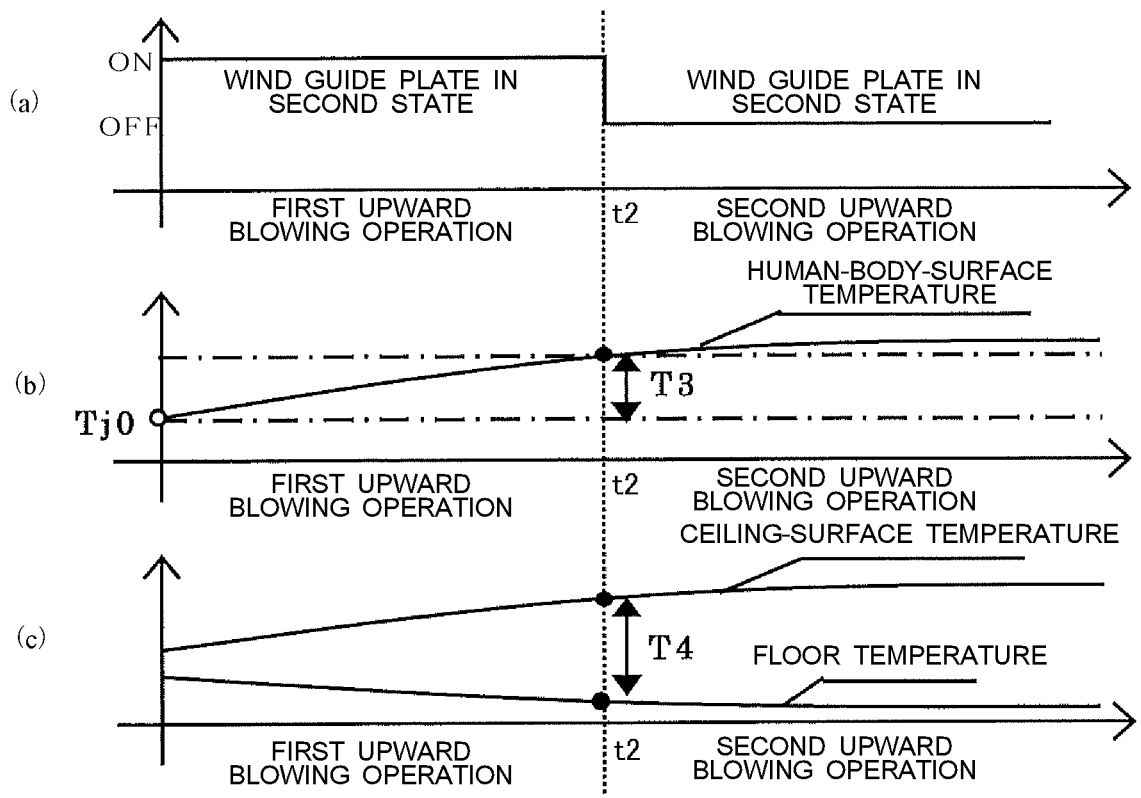
FIG. 8A indicates timing at which the second control is performed during the first upward blowing operation of the air-conditioning apparatus according to embodiment $1_1$ with FIG. 8A, (a) indicating the compressor operation, FIG. 8A, (b) indicating the change of the human-body-surface temperature, and FIG. 8A, (c) indicating the change of the ceiling-surface temperature and the change of the floor-surface temperature.
Figure 8B:
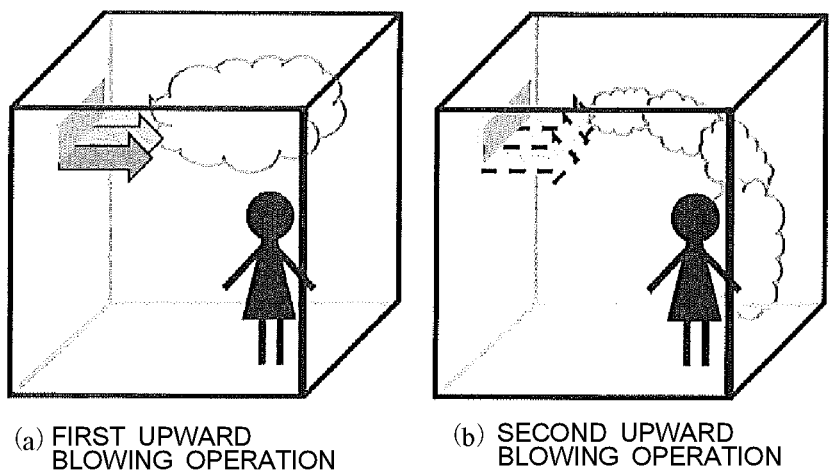
FIG. 8B, (a), illustrates an airflow during the first upward blowing operation, and FIG. 8B, (b), illustrates an airflow during a second upward blowing operation.

FIG. 8A indicates timing t2 at which the second control is performed during the first upward blowing operation of the air-conditioning apparatus 100 according to embodiment 1. FIG. 8B, (a), illustrates the airflow during the first upward blowing operation, and FIG. 8, (b), illustrates the airflow during the second upward blowing operation. FIG. 8A, (a), indicates whether the compressor 21 is in operation (ON) or in a stopped state (OFF). FIG. 8A, (b), indicates the change of the human-body-surface temperature. FIG. 8A, (c), indicates the change of the ceiling-surface temperature and the change of the floor-surface temperature. The horizontal axis in each of (a) to (c) in FIG. 8A indicates time.

As illustrated in FIG. 8A, (b), during the first upward blowing operation of the indoor unit 10, the human-body-surface temperature increases. When the human-body-surface temperature becomes higher than or equal to the sum of the reference human-body-surface temperature Tj0 and the temperature T3, the controller Cnt performs the second control. When the controller Cnt performs the second control, the wind guide plate 17 is kept in the second state, but the compressor 21 is stopped. That is, the indoor unit 10 performs the second upward blowing operation. The timing at which the second control is performed is indicated as timing t2 in FIG. 8A.

In addition to this timing, the indoor unit 10 performs the second control at the following timing. As illustrated in FIG. 8, (c), during the first upward blowing operation of the indoor unit 10, the difference between the ceiling-surface temperature and the floor-surface temperature increases. When the difference becomes greater than or equal to the temperature T4, the controller Cnt performs the second control.

[Timing t3 of Ending of Second Upward Blowing Operation]

Figure 9A:
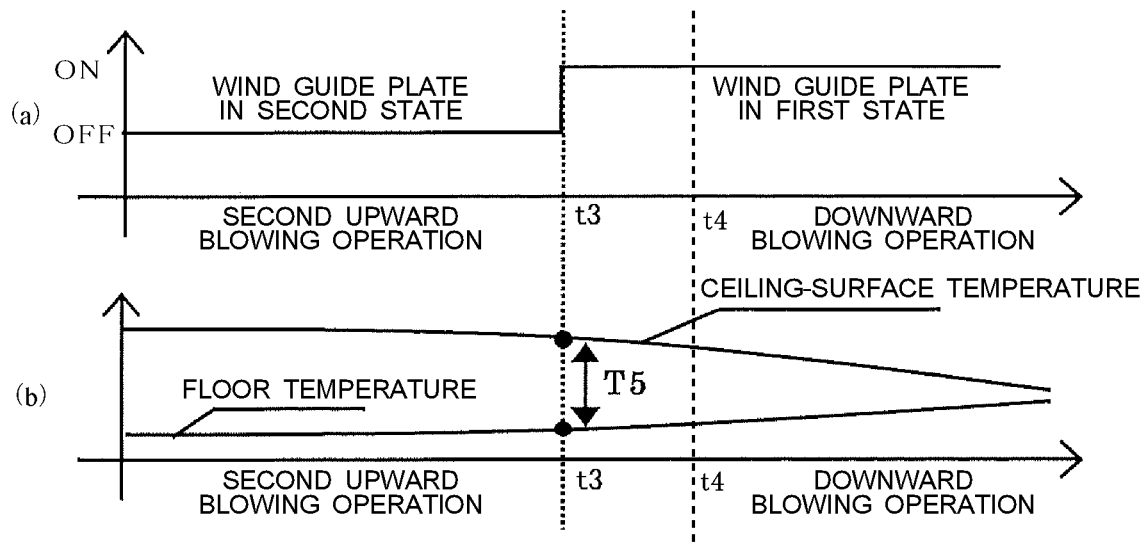
FIG. 9A indicates timing at which the second upward blowing operation (air-sending operation) in the air-conditioning apparatus according to embodiment 1 is ended, with FIG. 9A, (a) indicating the compressor operation, and FIG. 9A, (b) indicating the change of the ceiling-surface temperature and the change of the floor-surface temperature.
Figure 9B:
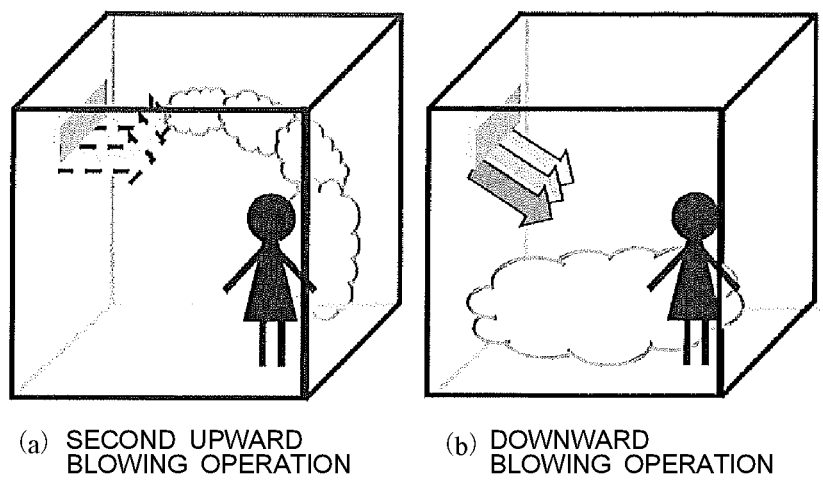
FIG. 9B, (a), illustrates the airflow during the second upward blowing operation, and FIG. 9B, (b), illustrates an airflow during a downward blowing operation.

FIG. 9A indicates timing t3 at which the air-conditioning apparatus 100 according to embodiment 1 ends the second upward blowing operation (the air-sending operation). FIG. 9B, (a), illustrates the airflow during the second upward blowing operation, and FIG. 9B, (b), illustrates the airflow during the downward blowing operation. FIG. 9A, (a), indicates whether the compressor 21 is in operation (ON) or in a stopped state (OFF). FIG. 9, (b), indicates the change of the ceiling-surface temperature and the change of the floor-surface temperature. The horizontal axis in each of FIGS. 9A, (a) and 9A, (b), indicates time.

As illustrated in FIG. 9A, (b), during the second upward blowing operation of the indoor unit 10, the difference between the ceiling-surface temperature and the floor-surface temperature decreases. When the difference becomes smaller than or equal to the temperature T5, the controller Cnt causes the compressor 21 to start operating. The timing at which the second upward blowing operation is ended is indicated as timing t3 in FIG. 9A. When the second upward blowing operation is ended and the temperature of the indoor heat exchanger 18 becomes higher than the temperature T1, the wind guide plate 17 is set in the first state. The timing at which the wind guide plate 17 is set in the first state is indicated as timing t4 in FIG. 9A. When the wind guide plate 17 is set in the first state, the indoor unit 10 starts to perform the downward blowing operation.

Embodiment 2

With respect to embodiment 2, descriptions of components which have the same configuration as those in embodiment 1 will be omitted. Embodiment 2 will be described mainly by referring to differences between embodiments 1 and 2.

In embodiment 1, it is determined whether or not to perform the first upward blowing operation based on the temperature of the indoor heat exchanger 18 (see step S113 in FIG. 6). By contrast, in embodiment 2, it is determined whether or not to change the operation to the first upward blowing operation based on the human-body-surface temperature Tj (step S201 in FIG. 10 which will be described later).

Furthermore, it should be noted that in embodiment 1, it is determined whether or not to perform the second blowing operation based on the ceiling-surface temperature Tt and the floor-surface temperature (step S119 in FIG. 6). On the other hand, in embodiment 2, it is determined whether or not to perform the second blowing operation based on the ceiling-surface temperature Tt (step S207 in FIG. 10).

In addition, in embodiment 1, it is determined whether the circulation of accumulated heat is achieved or not based on the ceiling-surface temperature Tt and the floor-surface temperature (step S122 in FIG. 6). By contrast, in embodiment 2, it is determined whether the circulation of accumulated heat is achieved or not based on the ceiling-surface temperature Tt (step S211 in FIG. 10).

The first detector 13 of embodiment 2 corresponds to a first sensor of the present invention.

The second detector 14 of embodiment 2 corresponds to a second sensor of the present invention.

The second detector 14 of embodiment 2 corresponds to a third sensor of the present invention.

The fourth detector 36 of embodiment 2 corresponds to a fourth sensor of the present invention.

The third detector 22 of embodiment 2 corresponds to a fifth sensor of the present invention.

The determining unit 34A has a function of comparing an acquired human-body-surface temperature Tj with a set temperature T0.

Also, the determining unit 34A has a function of comparing the difference between a ceiling-surface temperature Tt and a reference ceiling-surface temperature Tt0 with a temperature T6. Furthermore, the determining unit 34A has a function of comparing the difference between the ceiling-surface temperature Tt and the reference ceiling-surface temperature Tt0 with a temperature T7. The temperature T6 is, for example, 2 degrees C. The temperature T7 is, for example, −2 degrees C. The temperature T6 and the temperature T7 are predetermined temperatures stored in the storage unit 33.

Control Flow in Embodiment 2

Figure 10:
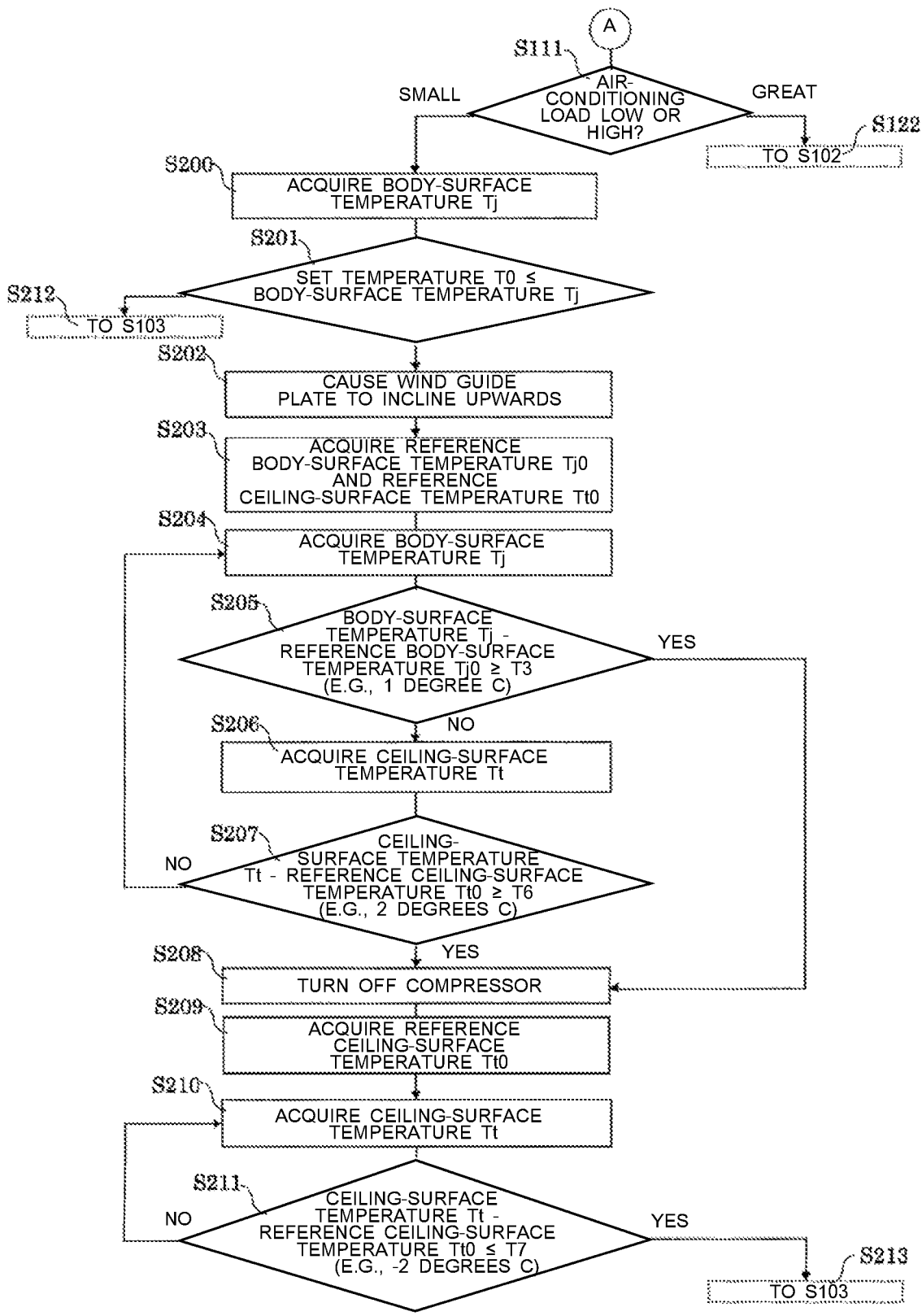
FIG. 10 is a flowchart of a control including a first control and a second control in an air-conditioning apparatus according to embodiment 2.

FIG. 10 is a flowchart of a control including a first control and a second control in the air-conditioning apparatus 100 according to embodiment 2. The control flow in FIG. 5 in embodiment 2 is the same as that in embodiment 1.

Since steps S100 to S112 in embodiment 2 are the same as those in embodiment 1, their descriptions will thus be omitted. Step S213 in embodiment 2 is the same as step S125 in embodiment 1; step S202 in embodiment 2 is the same as step S114 in embodiment 1; step S204 in embodiment 2 is the same as step S116 in embodiment 1; step S205 in embodiment 2 (determination 1 of whether to change the operation from the first blowing operation to the second blowing operation in embodiment 2) is the same as step S117 in embodiment 1 (determination 1 of whether to change the operation from the first blowing operation to the second blowing operation in embodiment 1); and step S208 in embodiment 2 is the same as step S120 in embodiment 1. Therefore, descriptions of steps S213, S202, S204, S205 and S208 in embodiment 2 will also be omitted.

(Step S200)

The controller Cnt acquires the human-body-surface temperature Tj from the second detector 14.

(Step S201: Determination of whether to Change Operation from Downward Blowing Operation to First Upward Blowing Operation)

The controller Cnt determines whether the human-body-surface temperature Tj is higher than or equal to the set temperature T0 or not. When the human-body-surface temperature Tj is higher than or equal to the set temperature T0, the process proceeds to step S202.

When step S201 is reached, it means that the condition in which the indoor temperature Ti exceeds the set temperature is satisfied in step S110. If the compressor 21 is stopped simply because the above condition is satisfied, the number of stops and starts of the compressor 21 increases. If the number of stops and starts of the compressor 21 increases, fluctuations in the sensory temperature for the person in the target space increase, and the comfort of the person is decreased. In addition, the energy consumption increases since a large amount of power is consumed when the compressor 21 restarts. Thus, when the process proceeds from step S201 to step S202, the compressor 21 continues to operate.

Furthermore, in the case where step S201 is reached, since steps S109 and S110 have been repeated as a loop and the operation of the indoor unit 10 has been changed to the low-capacity operation, the temperature of air blown from the indoor unit 10 has decreased. In addition, the human-body-surface temperature Tj is higher than or equal to the set temperature T0. Thus, even in the case where the compressor 21 continues to operate, when the wind guide plate 17 is in the first state, air whose temperature has been decreased is sent to the person whose human-body-surface temperature has been increased, thus causing the person to feel cold. Thus, in order to prevent decreasing of the comfort of the person, the process of the controller Cnt proceeds to step S202, and the controller Cnt causes the wind guide plate 17 to be set in the second state. Thereby, the comfort of the person is not decreased. In addition, heat can be easily accumulated in the upper region of the target space.

Furthermore, in the case where step S201 is reached, the condition in which the air-conditioning load Q' is low (the building is a super-insulated house) is satisfied in step S111. Thus, even if the operation of the indoor unit 10 has been changed to the low-capacity operation, heat does not easily escape outdoors, and heat can thus be easily accumulated.

When the human-body-surface temperature Tj is below the set temperature T0, the process proceeds to step S212.

(Step S203: Acquisition of Reference Ceiling-Surface Temperature Tt0 and Reference Human-Body-Surface Temperature Tj0)

The second detector 14 performs scanning to detect the ceiling-surface temperature and the human-body-surface temperature. The detected ceiling-surface temperature is stored as a reference ceiling-surface temperature Tt0 in the storage unit 33, and the detected human-body-surface temperature is stored as a reference human-body-surface temperature Tj0 in the storage unit 33. In other words, the controller Cnt acquires the reference ceiling-surface temperature Tt0 and the reference human-body-surface temperature Tj0 in step S203.

(Step S206: Acquisition 1 of Ceiling-Surface Temperature Tt)

The second detector 14 scans the ceiling surface of the target space. The controller Cnt acquires the ceiling-surface temperature Tt of the target space from the second detector 14.

(Step S207: Determination 2 of Whether to Change Operation from First Upward Blowing Operation to Second Upward Blowing Operation in Embodiment 2)

The controller Cnt determines whether the difference between the ceiling-surface temperature Tt of the target space and the reference ceiling-surface temperature Tt0 acquired in step S203 is greater than or equal to the temperature T6 or not. When the difference is greater than or equal to the temperature T6, the process proceeds to step S208. The process of the indoor unit 10 proceeds from step S207 to step S208, and the controller Cnt causes the compressor 21 to stop. In other words, the controller Cnt performs the second control. When the difference is smaller than the temperature T6, the process returns to step S204.

During the first upward blowing operation, warm air is supplied to the upper region of the target space, and the temperature of the ceiling surface thus increases. When the temperature of the upper region varies to differ from that of the lower region of the target space, the comfort of the person in the target space is decreased. Thus, when the difference between the temperatures of the upper and lower regions is greater than or equal to the temperature T6, the controller Cnt proceeds to step S208 to cause the compressor 21 to stop. When the process proceeds from step S207 to step S208, the indoor unit 10 starts to perform the second upward blowing operation. In other words, the operation of the indoor unit 10 changes from the first upward blowing operation to the second upward blowing operation (the air-sending operation). When the second upward blowing operation is started, accumulated heat is circulated in the target space, and the temperature difference between the upper and lower regions of the target space decreases.

(Step S209: Acquisition of Reference Ceiling-Surface Temperature Tt0)

The second detector 14 scans the ceiling surface to detect the ceiling-surface temperature. The detected ceiling-surface temperature is stored as a reference ceiling-surface temperature Tt0 in the storage unit 33. That is, the controller Cnt acquires the reference ceiling-surface temperature Tt0 in step S209.

(Step S210: Acquisition of Ceiling-Surface Temperature Tt)

The second detector 14 scans the ceiling surface of the target space. The controller Cnt acquires the ceiling-surface temperature Tt of the target space from the second detector 14.

(Step S211: Determination of Whether Accumulated Heat is Circulated)

The controller Cnt determines whether the difference between the ceiling-surface temperature Tt of the target space and the reference ceiling-surface temperature Tt0 acquired in step S209 is smaller than or equal to the temperature T7 or not. When the difference is smaller than or equal to the temperature T7, the process proceeds to step S213. When the difference is greater than or equal to the temperature T7, the process returns to step S210.

In the case where the difference is smaller than or equal to the temperature T7, it means that the accumulated heat is sufficiently circulated in the target space by the second upward blowing operation (the air-sending operation). In this case, the process of the indoor unit 10 proceeds to step S104 via steps S213 and S103.

(Step S212)

In step S123 in embodiment 1 that corresponds to step S212 in embodiment 2, the process proceeds to step S102. That is, the controller Cnt causes the compressor 21 to stop. In step S212 in embodiment 2, the process proceeds to step S103. In other words, the controller Cnt acquires the indoor temperature Ti without stopping the compressor 21. In the case where the process proceeds from step S201 to step S212, it is assumed that the human-body-surface temperature of the person in the target room has decreased. Thus, the process proceeds from step S212 to step S103 in order to avoid stopping of the compressor 21. Therefore, the indoor unit 10 can prevent the temperature of air to be blown from the air outlet 12 from being excessively reduced, and thus prevent the person from feeling cold.

Figure 11:
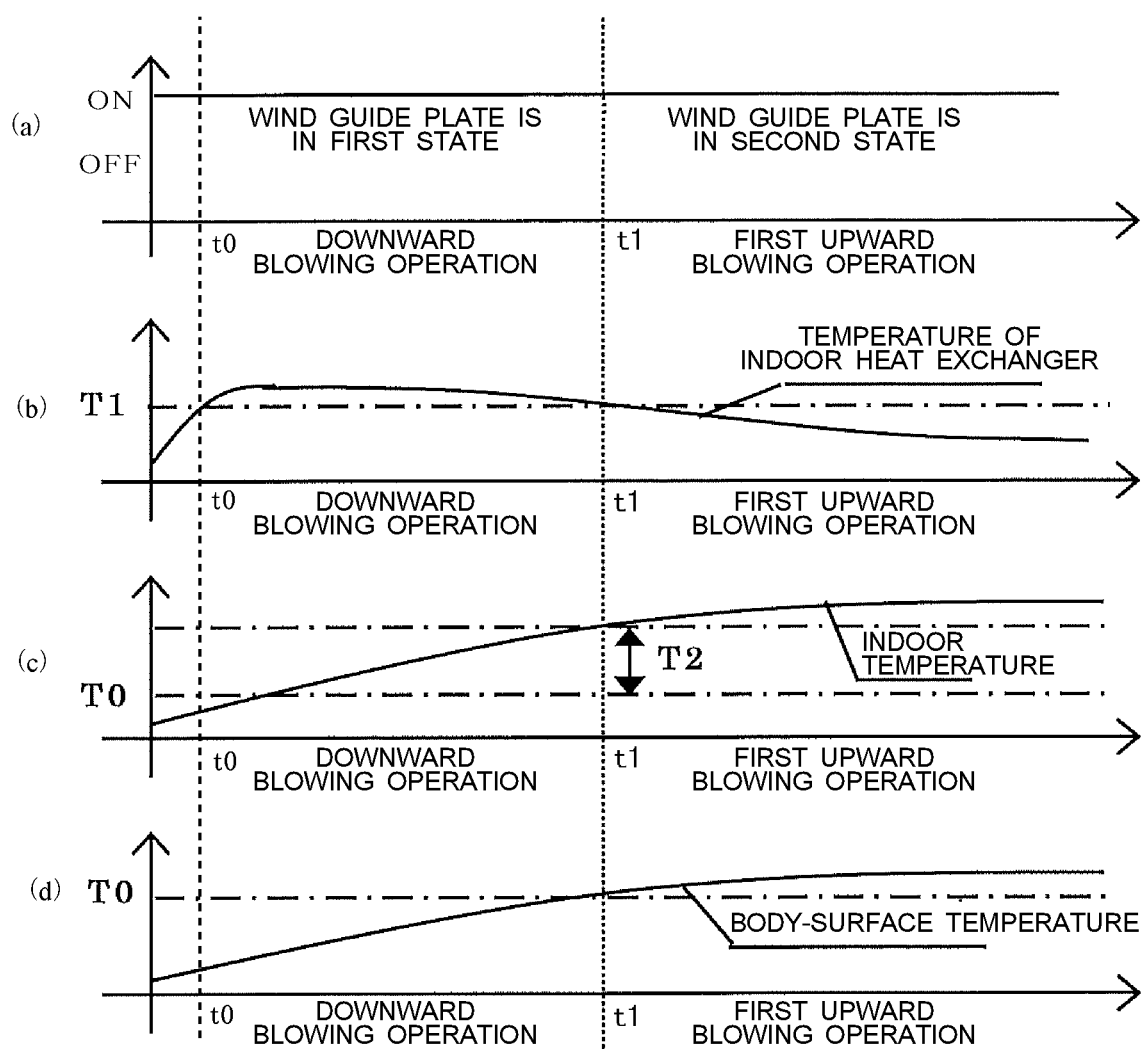
FIG. 11 indicates timing at which the second control is performed during the first upward blowing operation of the air-conditioning apparatus according to embodiment 2, with FIG. 11, (a) indicating the compressor operation, FIG. 11, (b) indicating a temperature change in the indoor heat exchanger, FIG. 11, (c) indicating a temperature change in the target space, and FIG. 11, (d) indicating a change of the human-body-surface temperature.
Figure 12:
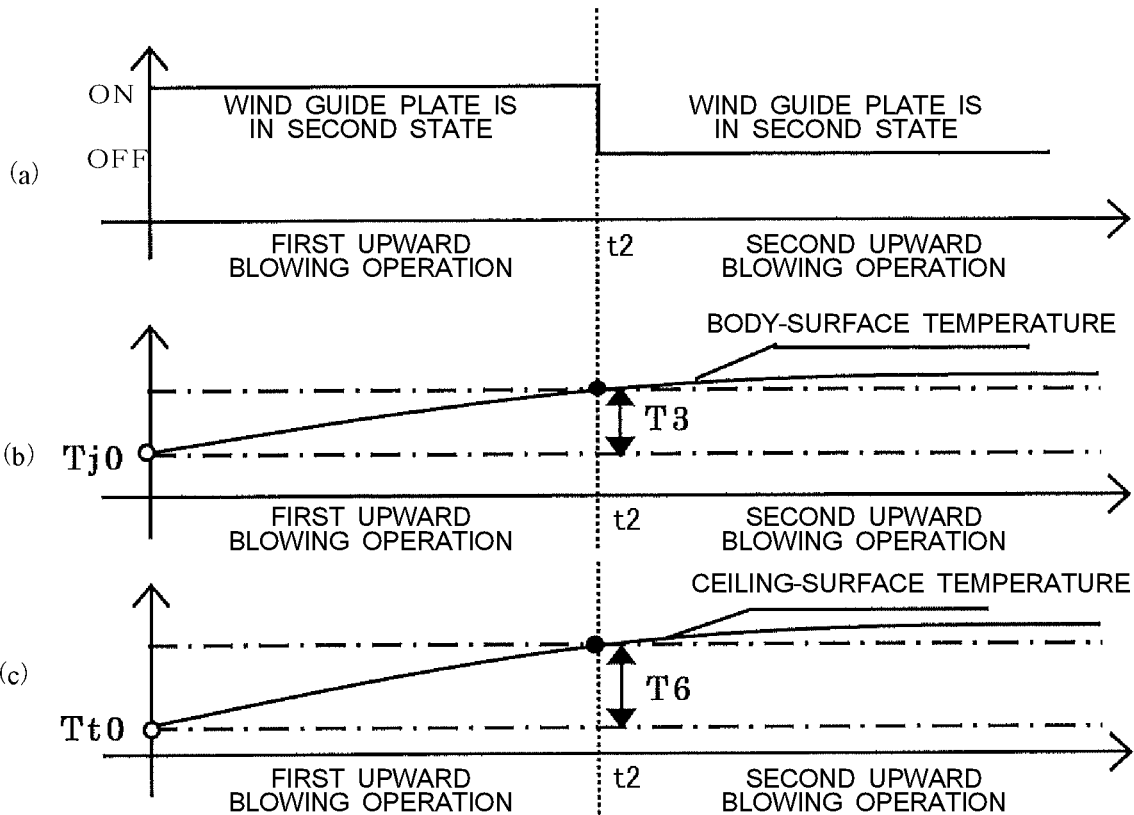
FIG. 12 illustrates timing at which the downward blowing operation is performed during the second upward blowing operation of the air-conditioning apparatus according to embodiment 2, with FIG. 12, (a) indicating the compressor operation, FIG. 12, (b) illustrating a change in the human-body-surface temperature, and FIG. 12, (c) illustrating a change in the ceiling-surface temperature.

FIG. 11 indicates timing at which the second control is performed during the first upward blowing operation of the air-conditioning apparatus 100 according to embodiment 2. FIG. 12 indicates timing at which the downward blowing operation is performed during the second upward blowing operation of the air-conditioning apparatus 100 according to embodiment 2.

[Timing t1 of Performance of First Control]

FIG. 11 indicates timing t1 at which the first control is performed during the downward blowing operation of the air-conditioning apparatus 100 according to embodiment 2. FIG. 11, (a), indicates whether the compressor 21 is in operation (ON) or in a stopped state (OFF). FIG. 11, (b), indicates a temperature change in the indoor heat exchanger 18. FIG. 11, (c), indicates a temperature change in the target space. FIG. 11, (d), indicates a change of the human-body-surface temperature. The horizontal axis in each of (a) to (d) in FIG. 11 indicates time.

As illustrated in FIG. 11, (b), when the indoor unit 10 starts to perform the heating operation, the temperature of the indoor heat exchanger 18 increases. When the temperature of the indoor heat exchanger 18 becomes higher than the temperature T1, the wind guide plate 17 is set in the first state. The timing at which the wind guide plate 17 is set in the first state is indicated as timing t0 in FIG. 11. When the wind guide plate 17 is set in the first state, the indoor unit 10 starts to perform the downward blowing operation. As illustrated in FIG. 11, (c), when the indoor unit 10 starts to perform the downward blowing operation, the indoor temperature increases. When the indoor temperature approaches the sum of the set temperature T0 and the temperature T2, the rotation speed of the compressor 21 decreases, and the indoor unit 10 operates in the low-capacity operation mode. When the indoor temperature becomes higher than or equal to the sum of the set temperature T0 and the temperature T2 (see FIG. 11, (c)) or the human-body-surface temperature becomes higher than or equal to the set temperature T0 (see FIG. 11, (d)), the controller Cnt performs the first control. The timing at which the first control is performed is indicated as timing t1 in FIG. 11. When the controller Cnt performs the first control, the state of the wind guide plate 17 is changed from the first state to the second state. That is, the indoor unit 10 starts to perform the first upward blowing operation.

[Timing t2 for Performing Second Control]

FIG. 12 indicates timing t2 at which the second control is performed during the first upward blowing operation of the air-conditioning apparatus 100 according to embodiment 2. FIG. 12, (a), indicates whether the compressor 21 is in operation (ON) or in a stopped state (OFF). FIG. 12(b) illustrates a change in the human-body-surface temperature.

FIG. 12(c) illustrates a change in the ceiling-surface temperature. The horizontal axis in each of (a) to (c) in FIG. 12 indicates time.

As illustrated in FIG. 12, (b), during the first upward blowing operation of the indoor unit 10, the human-body-surface temperature increases. When the human-body-surface temperature becomes higher than or equal to the sum of the reference human-body-surface temperature Tj0 and the temperature T3, the controller Cnt performs the second control. When the controller Cnt performs the second control, the wind guide plate 17 is kept in the second state, but the compressor 21 is stopped. In other words, the indoor unit 10 performs the second upward blowing operation. The timing at which the second control is performed is indicated as timing t2 in FIG. 12.

In addition to this timing, the indoor unit 10 has another timing as timing at which the second control is performed. As illustrated in FIG. 12, (c), during the first upward blowing operation of the indoor unit 10, the difference between the ceiling-surface temperature and the reference ceiling-surface temperature Tt0 increases. When the difference becomes greater than or equal to the temperature T6, the controller Cnt performs the second control.

[Timing t3 of Performance of Second Upward Blowing Operation]

Figure 13:
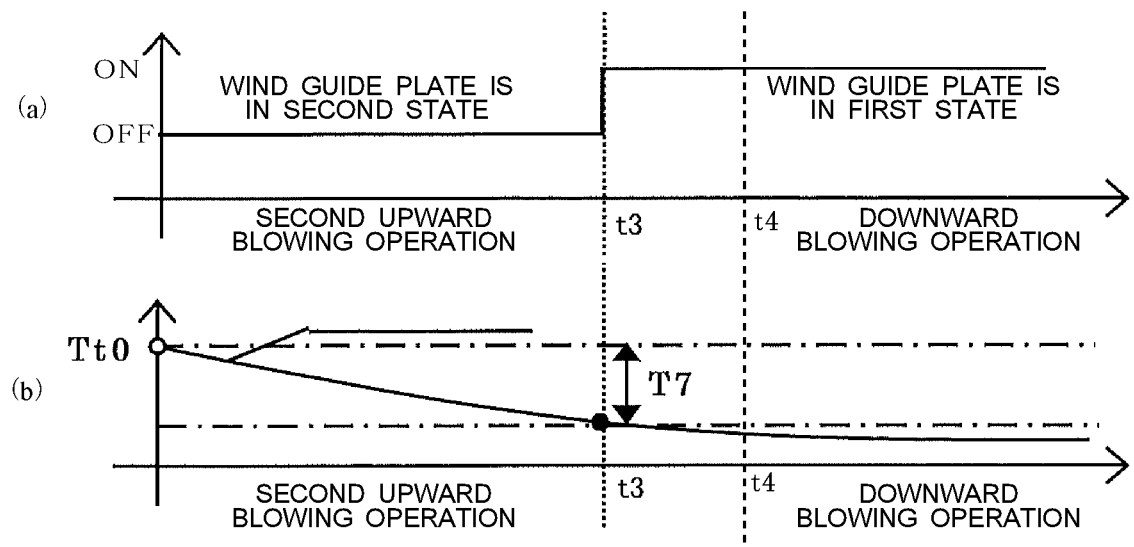
FIG. 13 illustrates timing at which the second upward blowing operation (air-sending operation) of the air-conditioning apparatus according to embodiment 2 is ended, with FIG. 13, (a) indicating the compressor operation, and FIG. 13, (b) indicating a change in the ceiling-surface temperature.

FIG. 13 indicates timing t3 at which the air-conditioning apparatus 100 according to embodiment 2 ends the second upward blowing operation (the air-sending operation). FIG. 13, (a), indicates whether the compressor 21 is in operation (ON) or in a stopped state (OFF). FIG. 13 indicates a change in the ceiling-surface temperature. The horizontal axis in each of (a) and (b) in FIG. 13 indicates time.

As illustrated in FIG. 13, (b), during the second upward blowing operation of the indoor unit 10, the difference between the ceiling-surface temperature and the reference ceiling-surface temperature Tt0 decreases. When the difference becomes smaller than or equal to the temperature T7 (step S122 in FIG. 6) and the acquired indoor temperature Ti becomes lower than the set temperature T0 (step S104 in FIG. 5), the controller Cnt causes the compressor 21 to start operating (step S105 in FIG. 5), as illustrated in FIG. 13, (a). The timing at which the second upward blowing operation is ended is indicated as timing t3 in FIG. 13. When the second upward blowing operation is ended and the temperature of the indoor heat exchanger 18 becomes higher than the temperature T1, the wind guide plate 17 is set in the first state. The timing at which the wind guide plate 17 is set in the first state is indicated as timing t4 in FIG. 13. When the wind guide plate 17 is set in the first state, the indoor unit 10 starts to perform the downward blowing operation.

[Temperatures T1 to T3, T6 and T7]

The controller Cnt can change the temperatures T1 to T3, T6, and T7. The temperatures T6 and T7 can be set based on the magnitude of the air-conditioning load Q'.

The temperature T6 is set to 3 degrees C. when the air-conditioning load Q' falls within a first range, is set to 2 degrees C. when the air-conditioning load Q' falls within a second range, and is set to 1 degree C. when the air-conditioning load Q' falls within a third range. The second range is larger than the first range, and the third range is larger than the second range. In other words, the controller Cnt sets the temperature T6 to a low value when the acquired air-conditioning load Q' is high, and sets the temperature T6 to a high value when the acquired air-conditioning load Q' is low.

The temperature T7 is set to −3 degrees C. when the air-conditioning load Q' falls within the first range, is set to −2 degrees C. when the air-conditioning load Q' falls within the second range, and is set to −1 degree C. when the air-conditioning load Q' falls within the third range. The second range is larger than the first range, and the third range is larger than the second range. That is, the controller Cnt sets the temperature T7 to a low value when the acquired air-conditioning load Q' is low, and sets the temperature T7 to a high value when the acquired air-conditioning load Q' is high. Therefore, the relationship between the temperature T6 and the air-conditioning load Q' is opposite to the relationship between the temperature T7 and the air-conditioning load Q'.

The temperature T3 of embodiment 2 corresponds to a first difference of the present invention.

The temperature T6 of embodiment 2 corresponds to a second difference of the present invention.

The temperature T7 of embodiment 2 corresponds to a third difference of the present invention.

The reference human-body-surface temperature Tj0 of embodiment 2 corresponds to a reference temperature of the present invention.

The determination in step S119 in embodiment 1 and the determination in step S207 in embodiment 2 are interchangeable. That is, in embodiment 1, step S207 may be applied in place of step S119; and in embodiment 2, step S119 may be applied in place of step S207.

The determination in step S122 in embodiment 1 and the determination in step S211 in embodiment 2 are interchangeable. That is, in embodiment 1, step S211 may be applied in place of step S122; and in embodiment 2, step S122 may be applied in place of step S211.

REFERENCE SIGNS LIST 10 indoor unit 11 air inlet 12 air outlet 13 first detector 14 second detector 15 reception unit 16 transmission unit 17 wind guide plate 17A wind guide plate 18 indoor heat exchanger 19 indoor fan 20 outdoor unit 21 compressor 22 third detector 23 outdoor heat exchanger 24 outdoor fan 25 four-way valve 26 pressure-reducing device 30 indoor electrical-component box 31 controller 32 input unit 33 storage unit 34 processing unit 34A determining unit 34B load calculating unit 34C operation control unit 35 output unit 36 fourth detector 37 fan motor 38 wind-guide-plate motor 40 outdoor electrical-component box 41 controller 50 connection cable 100 air-conditioning apparatus 201 outdoor unit Cnt controller DR1 first direction DR2 second direction Dr1 first direction Dr2 second direction Rc refrigerant circuit Rp refrigerant pipe T0 set temperature T1 temperature T2 temperature T3 temperature T4 temperature T5 temperature T6 temperature T7 temperature Ti indoor temperature Tj human-body-surface temperature Tj0 reference human-body-surface temperature Tn temperature To outside air temperature Tt ceiling-surface temperature Tt0 reference ceiling-surface temperature Ty floor-surface temperature θ1 angle θ2 angle

The invention claimed is:

1. An air-conditioning apparatus comprising:
an indoor unit including an air outlet;
a refrigerant circuit including a compressor, a first heat exchanger, a pressure-reducing device, and a second heat exchanger included in the indoor unit;
a fan included in the indoor unit;
a wind guide plate included in the indoor unit, and allowed to be rotated to be in a first state in which the wind guide plate causes air to be blown from the air outlet in a first direction, and to be in a second state in which the wind guide plate causes air to be blown from the air outlet in a direction upwardly inclined to the first direction, the wind guide plate being rotated such that a state of the wind guide plate changes between the first and second states;
a first sensor configured to detect a temperature of air in target space for air-conditioning;
a second sensor configured to detect a temperature of the second heat exchanger;
a third sensor configured to detect a temperature of a person in the target space; and
a controller configured to control the compressor, the fan and the wind guide plate,
wherein the controller performs a first control, in a case where the compressor is in operation, the fan is in operation, the wind guide plate is in the first state and the second heat exchanger operates as a condenser, when the detected temperature of the air in the target space is higher than a set temperature for the target space and the detected temperature of the second heat exchanger is lower than or equal to a first reference temperature, the first control being a control to keep the compressor and the fan in operation and switch the state of the wind guide plate from the first state to the second state, and
the controller performs a second control, when a difference between the detected temperature of the person and a second reference temperature is greater than a first difference after the first control is performed, the second control being a control to stop the compressor, keep the fan in operation and also keep the wind guide plate in the second state.

2. The air-conditioning apparatus of claim 1, wherein the second reference temperature is the detected temperature of the person, which is acquired by the controller after the first control is performed.

3. The air-conditioning apparatus of claim 1, further comprising:
a fourth sensor configured to detect a temperature of a ceiling surface of the target space; and
a fifth sensor configured to detect a temperature of a floor surface of the target space,
wherein the controller performs the second control, when a difference between the detected temperature of the ceiling surface and the detected temperature of the floor surface is greater than or equal to a second difference after the first control is performed, the second control being a control to stop the compressor, keep the fan in operation and also keep the wind guide plate in the second state.

4. The air-conditioning apparatus of claim 3, wherein the detected temperature of the ceiling surface and the detected temperature of the floor surface are temperatures acquired by the controller after the first control is performed.

5. The air-conditioning apparatus of claim 3, wherein the controller causes the compressor to restart operation, when a difference between the detected temperature of the ceiling surface and the detected temperature of the floor surface is smaller than or equal to a third difference after the second control is performed.

6. The air-conditioning apparatus of claim 5, wherein the detected temperature of the ceiling surface and the detected temperature of the floor surface are temperatures acquired by the controller after the second control is performed.

7. The air-conditioning apparatus of claim 1, further comprising
  a sixth sensor configured to detect a temperature of outside air,
  wherein the controller acquires an air-conditioning load of the target space based on the temperature detected by the first sensor, the temperature detected by the second sensor and the temperature detected by the sixth sensor.

8. The air-conditioning apparatus of claim 7,
  wherein the controller performs the first control when the detected temperature of the air of the target space is higher than the set temperature for the target space, the detected temperature of the second heat exchanger is lower than or equal to the first reference temperature and the air-conditioning load of the target space is higher than a predetermined load.

9. An air-conditioning apparatus comprising:
  an indoor unit including an air outlet;
  a refrigerant circuit including a compressor, a first heat exchanger, a pressure-reducing device, and a second heat exchanger included in the indoor unit;
  a fan included in the indoor unit;
  a wind guide plate included in the indoor unit, and allowed to be rotated to be in a first state in which the wind guide plate causes air to be blown from the air outlet in a first direction, and to be in a second state in which the wind guide plate causes air to be blown from the air outlet in a direction upwardly inclined to the first direction, the wind guide plate being rotated such that a state of the wind guide plate changes between the first and second states;
  a first sensor configured to detect a temperature of air in target space for air-conditioning;
  a second sensor configured to detect a temperature of a person in the target space; and
  a controller configured to control the compressor, the fan and the wind guide plate,
  wherein the controller performs a first control, in a case where the compressor is in operation, the fan is in operation, the wind guide plate is in the first state and the second heat exchanger operates as a condenser, when the detected temperature of the air in the target space is higher than a set temperature for the target space and the detected temperature of the person is higher than or equal to the set temperature, the first control being a control to keep the compressor and the fan in operation and switch the state of the wind guide plate from the first state to the second state, and
  the controller performs a second control, when a difference between the detected temperature of the person and a reference temperature is greater than or equal to a first difference after the first control is performed, the second control being a control to stop the compressor, keep the fan in operation and also keep the wind guide plate in the second state.

10. The air-conditioning apparatus of claim 9,
  wherein the reference temperature is the detected temperature of the occupant acquired by the controller after the first control is performed.

11. The air-conditioning apparatus of claim 9, further comprising
  a third sensor configured to detect a temperature of a ceiling surface of the target space,
  wherein the controller performs the second control, when a difference between the detected temperature of the ceiling surface and a reference ceiling-surface temperature is greater than or equal to a second difference after the first control is performed, the second control being a control to stop the compressor, keep the fan in operation and also keep the wind guide plate in the second state.

12. The air-conditioning apparatus of claim 9, further comprising
  a third sensor configured to detect a temperature of a ceiling surface of the target space,
  wherein the controller performs the second control, when a difference between the detected temperature of the person and a reference temperature is smaller than a first difference after the first control is performed and a difference between the detected temperature of the ceiling surface and a reference ceiling-surface temperature is greater than or equal to a second difference after the first control is performed, the second control being a control to stop the compressor, keep the fan in operation and also keep the wind guide plate in the second state.

13. The air-conditioning apparatus of claim 11,
  wherein the reference ceiling-surface temperature is the temperature of the ceiling surface acquired by the controller after the first control is performed.

14. The air-conditioning apparatus of claim 11,
  wherein the controller causes the compressor to restart operation, when a difference between the detected temperature of the ceiling surface and the reference ceiling-surface temperature is smaller than or equal to a third difference after the second control is performed.

15. The air-conditioning apparatus of claim 14,
  wherein the reference ceiling-surface temperature is the temperature of the ceiling surface acquired by the controller after the second control is performed.

16. The air-conditioning apparatus of claim 9, further comprising:
  a fourth sensor configured to detect a temperature of the second heat exchanger; and
  a fifth sensor configured to detect a temperature of outside air,
  wherein the controller acquires an air-conditioning load of the target space based on the temperature detected by the first sensor, the temperature detected by the fourth sensor and the temperature detected by the fifth sensor.

17. The air-conditioning apparatus of claim 16,
  wherein the controller performs the first control, when the detected temperature of the target space is higher than the set temperature for the target space, the detected temperature of the person is higher than or equal to the set temperature and the air-conditioning load of the target space is higher than a predetermined load.

18. An air-conditioning apparatus comprising:
  an indoor unit including an air outlet;
  a refrigerant circuit including a compressor, a first heat exchanger, a pressure-reducing device, and a second heat exchanger included in the indoor unit;
  a fan included in the indoor unit;
  a wind guide plate included in the indoor unit, and allowed to be rotated to be in a first state in which the wind guide plate causes air to be blown from the air outlet in a first direction, and to be in a second state in which the wind guide plate causes air to be blown from the air outlet in a direction upwardly inclined to the first direction, the wind guide plate being rotated such that a state of the wind guide plate changes between the first and second states;
  a first sensor configured to detect a temperature of air in target space for air-conditioning;

a second sensor configured to detect a temperature of the second heat exchanger;
a fourth sensor configured to detect a temperature of a ceiling surface of the target space; and
a fifth sensor configured to detect a temperature of a floor surface of the target space,
a controller configured to control the compressor, the fan and the wind guide plate,
wherein the controller performs a first control, in a case where the compressor is in operation, the fan is in operation, the wind guide plate is in the first state and the second heat exchanger operates as a condenser, when the detected temperature of the air in the target space is higher than a set temperature for the target space and the detected temperature of the second heat exchanger is lower than or equal to a first reference temperature, the first control being a control to keep the compressor and the fan in operation and switch the state of the wind guide plate from the first state to the second state, and
the controller performs a second control, when a difference between the detected temperature of the ceiling surface and the detected temperature of the floor surface is greater than or equal to a second difference after the first control is performed, the second control being a control to stop the compressor, keep the fan in operation and also keep the wind guide plate in the second state.

19. An air-conditioning apparatus comprising:
an indoor unit including an air outlet;
a refrigerant circuit including a compressor, a first heat exchanger, a pressure-reducing device, and a second heat exchanger included in the indoor unit;
a fan included in the indoor unit;
a wind guide plate included in the indoor unit, and allowed to be rotated to be in a first state in which the wind guide plate causes air to be blown from the air outlet in a first direction, and to be in a second state in which the wind guide plate causes air to be blown from the air outlet in a direction upwardly inclined to the first direction, the wind guide plate being rotated such that a state of the wind guide plate changes between the first and second states;
a first sensor configured to detect a temperature of air in target space for air-conditioning;
a second sensor configured to detect a temperature of the second heat exchanger;
a sixth sensor configured to detect a temperature of outside air; and
a controller configured to control the compressor, the fan, and the wind guide plate,
wherein the controller acquires an air-conditioning load of the target space based on the temperature detected by the first sensor, the temperature detected by the second sensor and the temperature detected by the sixth sensor, and
the controller performs a first control, in a case where the compressor is in operation, the fan is in operation, the wind guide plate is in the first state and the second heat exchanger operates as a condenser, when the detected temperature of the air in the target space is higher than a set temperature for the target space, the detected temperature of the second heat exchanger is lower than or equal to a first reference temperature, and the air-conditioning load of the target space is higher than a predetermined load, the first control being a control to keep the compressor and the fan in operation and switch the state of the wind guide plate from the first state to the second state.

20. An air-conditioning apparatus comprising:
an indoor unit including an air outlet;
a refrigerant circuit including a compressor, a first heat exchanger, a pressure-reducing device, and a second heat exchanger included in the indoor unit;
a fan included in the indoor unit;
a wind guide plate included in the indoor unit, and allowed to be rotated to be in a first state in which the wind guide plate causes air to be blown from the air outlet in a first direction, and to be in a second state in which the wind guide plate causes air to be blown from the air outlet in a direction upwardly inclined to the first direction, the wind guide plate being rotated such that a state of the wind guide plate changes between the first and second states;
a first sensor configured to detect a temperature of air in target space for air-conditioning;
a second sensor configured to detect a temperature of a person in the target space;
a third sensor configured to detect a temperature of a ceiling surface of the target space; and
a controller configured to control the compressor, the fan, and the wind guide plate,
wherein the controller performs a first control, in a case where the compressor is in operation, the fan is in operation, the wind guide plate is in the first state and the second heat exchanger operates as a condenser, when the detected temperature of the air in the target space is higher than a set temperature for the target space and the detected temperature of the person is higher than or equal to the set temperature, the first control being a control to keep the compressor and the fan in operation and switch the state of the wind guide plate from the first state to the second state, and
the controller performs a second control, when a difference between the detected temperature of the ceiling surface and a reference ceiling-surface temperature is greater than or equal to a second difference after the first control is performed, the second control being a control to stop the compressor, keep the fan in operation and also keep the wind guide plate in the second state.

21. An air-conditioning apparatus comprising:
an indoor unit including an air outlet;
a refrigerant circuit including a compressor, a first heat exchanger, a pressure-reducing device, and a second heat exchanger included in the indoor unit;
a fan included in the indoor unit;
a wind guide plate included in the indoor unit, and allowed to be rotated to be in a first state in which the wind guide plate causes air to be blown from the air outlet in a first direction, and to be in a second state in which the wind guide plate causes air to be blown from the air outlet in a direction upwardly inclined to the first direction, the wind guide plate being rotated such that a state of the wind guide plate changes between the first and second states;
a first sensor configured to detect a temperature of air in target space for air-conditioning;
a second sensor configured to detect a temperature of a person in the target space;
a fourth sensor configured to detect a temperature of the second heat exchanger; and a fifth sensor configured to detect a temperature of outside air; and
a controller configured to control the compressor, the fan, and the wind guide plate,
wherein the controller acquires an air-conditioning load of the target space based on the temperature detected by the first sensor, the temperature detected by the fourth sensor and the temperature detected by the fifth sensor, and
the controller performs a first control, in a case where the compressor is in operation, the fan is in operation, the wind guide plate is in the first state and the second heat exchanger operates as a condenser, when the detected temperature of the air in the target space is higher than a set temperature for the target space, the detected temperature of the person is higher than or equal to the set temperature, and the air-conditioning load of the target space is higher than a predetermined load, the first control being a control to keep the compressor and the fan in operation and switch the state of the wind guide plate from the first state to the second state.

* * * * *